United States Patent
Whitehead et al.

(10) Patent No.: US 8,949,090 B2
(45) Date of Patent: Feb. 3, 2015

(54) FORMATION FLIGHT CONTROL

(71) Applicant: The Boeing Company, Chicago, IL (US)

(72) Inventors: Brian T. Whitehead, Renton, WA (US); Stefan R. Bieniawski, Seattle, WA (US); David Halaas, Buckley, WA (US); Eugene Lavretsky, Los Angeles, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/752,119

(22) Filed: Jan. 28, 2013

(65) Prior Publication Data

US 2014/0214243 A1    Jul. 31, 2014

(51) Int. Cl.
| | | |
|---|---|---|
| *B64C 19/00* | (2006.01) | |
| *B60R 16/023* | (2006.01) | |
| *G05D 1/02* | (2006.01) | |
| *G05D 1/08* | (2006.01) | |
| *G05D 1/10* | (2006.01) | |

(52) U.S. Cl.
CPC .............. *B64C 19/00* (2013.01); *G05D 1/0202* (2013.01); *G05D 1/0825* (2013.01); *G05D 1/104* (2013.01)
USPC .......................... 703/3; 701/36; 701/2; 244/13

(58) Field of Classification Search
CPC ........................................................ G05D 1/04
USPC ............................................. 340/958; 701/7
See application file for complete search history.

(56) References Cited

U.S. PATENT DOCUMENTS

| | | | | |
|---|---|---|---|---|
| 4,029,271 A | * | 6/1977 | Murphy et al. | ............ 244/17.13 |
| 4,094,479 A | * | 6/1978 | Kennedy, Jr. | ................. 244/179 |
| 4,615,213 A | * | 10/1986 | Hagen | ............... 73/180 |
| 5,050,086 A | * | 9/1991 | Lambregts | ........................ 701/4 |
| 5,170,969 A | * | 12/1992 | Lin | ............... 244/194 |
| 5,375,794 A | * | 12/1994 | Bleeg | ........................ 244/76 C |
| 5,442,958 A | * | 8/1995 | Hagen | ........................ 73/170.02 |
| 5,596,332 A | * | 1/1997 | Coles et al. | ................... 342/455 |

(Continued)

OTHER PUBLICATIONS

Maziar S. Hemati, Jeff D. Eldredge, and Jason L. Speyer, "Wake Sensing for Aircraft Formation Flight," AIAA Guidance, Navigation, and Control Conference Aug. 13-16, 2012, Minneapolis, Minnesota.*

(Continued)

*Primary Examiner* — John R Olszewski
*Assistant Examiner* — Mohsen Ghajargar
(74) *Attorney, Agent, or Firm* — Kunzler Law Group, PC

(57) ABSTRACT

An apparatus for controlling the formation flight of a trailing aircraft relative to a vortex generated by a leading aircraft includes a position module, peak-seeking module, limiter module, and control module. The position module is configured to determine a position of the vortex relative to the trailing aircraft. The peak-seeking module is configured to determine a desired position of the trailing aircraft for providing desired vortex-induced aerodynamic benefits based on the position of the vortex relative to the trailing aircraft and a mapping function of an individual performance metric. The limiter module is configured to modify the desired position of the trailing aircraft to avoid unintended crossings of the trailing aircraft into the vortex. Finally, the control module is configured to control flight of the trailing aircraft based on one of the desired position of the trailing aircraft and modified desired position of the trailing aircraft.

20 Claims, 9 Drawing Sheets

(56) References Cited

U.S. PATENT DOCUMENTS

| | | | |
|---|---|---|---|
| 5,669,582 A * | 9/1997 | Bryant et al. | 244/76 C |
| 5,951,608 A * | 9/1999 | Osder | 701/11 |
| 6,305,218 B1 * | 10/2001 | Foster | 73/178 R |
| 6,330,483 B1 * | 12/2001 | Dailey | 700/28 |
| 6,531,967 B2 * | 3/2003 | Djorup | 340/949 |
| 6,563,452 B1 * | 5/2003 | Zheng et al. | 342/26 R |
| 6,785,610 B2 * | 8/2004 | Baker et al. | 701/301 |
| 6,845,303 B1 * | 1/2005 | Byler | 701/13 |
| 7,031,811 B2 * | 4/2006 | Parsons et al. | 701/7 |
| 7,228,227 B2 * | 6/2007 | Speer | 701/467 |
| 7,248,967 B2 * | 7/2007 | Hagstedt | 701/507 |
| 7,305,286 B1 * | 12/2007 | Younkin et al. | 701/7 |
| 7,379,839 B2 * | 5/2008 | Cronin et al. | 702/138 |
| 7,539,561 B2 * | 5/2009 | Nonami et al. | 701/3 |
| 8,086,362 B2 * | 12/2011 | Dupre et al. | 701/14 |
| 8,219,264 B1 * | 7/2012 | Blake | 701/3 |
| 8,219,266 B2 * | 7/2012 | Puig et al. | 701/10 |
| 8,255,101 B2 * | 8/2012 | Virelizier et al. | 701/14 |
| 8,376,284 B2 * | 2/2013 | Lewis et al. | 244/199.3 |
| 8,437,887 B2 * | 5/2013 | Coulmeau | 701/3 |
| 8,447,443 B1 * | 5/2013 | Ryan et al. | 701/3 |
| 8,538,607 B2 * | 9/2013 | Manfred et al. | 701/3 |
| 2002/0089432 A1 * | 7/2002 | Staggs et al. | 340/945 |
| 2002/0171563 A1 * | 11/2002 | Djorup | 340/968 |
| 2003/0014165 A1 * | 1/2003 | Baker et al. | 701/3 |
| 2003/0222795 A1 * | 12/2003 | Holforty et al. | 340/968 |
| 2004/0070521 A1 * | 4/2004 | Greene | 340/969 |
| 2005/0114023 A1 * | 5/2005 | Williamson et al. | 701/214 |
| 2005/0171652 A1 * | 8/2005 | Speer | 701/4 |
| 2005/0230563 A1 * | 10/2005 | Corcoran, III | 244/175 |
| 2005/0269456 A1 * | 12/2005 | Saggio et al. | 244/135 A |
| 2006/0015247 A1 * | 1/2006 | Speer | 701/206 |
| 2006/0074558 A1 * | 4/2006 | Williamson et al. | 701/213 |
| 2006/0216674 A1 * | 9/2006 | Baranov et al. | 434/29 |
| 2006/0244637 A1 * | 11/2006 | Baranov et al. | 340/968 |
| 2007/0102565 A1 * | 5/2007 | Speer et al. | 244/2 |
| 2007/0103340 A1 * | 5/2007 | Baranov et al. | 340/968 |
| 2007/0136030 A1 * | 6/2007 | Delaplace et al. | 703/1 |
| 2008/0030375 A1 * | 2/2008 | Cotton et al. | 340/945 |
| 2010/0064766 A1 * | 3/2010 | Nugent et al. | 73/1.16 |
| 2010/0152926 A1 * | 6/2010 | Onu et al. | 701/3 |
| 2010/0241294 A1 * | 9/2010 | Virelizier et al. | 701/14 |
| 2010/0283635 A1 * | 11/2010 | Brinkman et al. | 340/961 |
| 2011/0004361 A1 * | 1/2011 | Goupil et al. | 701/3 |
| 2011/0057830 A1 * | 3/2011 | Sampigethaya et al. | 342/36 |
| 2011/0062278 A1 * | 3/2011 | Ulrich et al. | 244/48 |
| 2011/0270473 A1 * | 11/2011 | Reynolds et al. | 701/7 |
| 2011/0282524 A1 * | 11/2011 | Mutuel et al. | 701/14 |
| 2012/0004844 A1 * | 1/2012 | Sahasrabudhe et al. | 701/300 |
| 2012/0053916 A1 * | 3/2012 | Tzidon | 703/8 |
| 2012/0061506 A1 * | 3/2012 | Gomez et al. | 244/2 |
| 2012/0078540 A1 * | 3/2012 | McIntyre | 702/50 |
| 2012/0083946 A1 * | 4/2012 | Maldonado et al. | 701/3 |
| 2012/0150426 A1 * | 6/2012 | Conway | 701/120 |
| 2012/0286102 A1 * | 11/2012 | Sinha et al. | 244/7 B |
| 2012/0325977 A1 * | 12/2012 | Giesseler | 244/213 |
| 2013/0226374 A1 * | 8/2013 | Hagerott et al. | 701/3 |
| 2013/0311011 A1 * | 11/2013 | Malta | 701/3 |
| 2013/0338859 A1 * | 12/2013 | Yamasaki | 701/3 |

OTHER PUBLICATIONS

David F. Chichka, Jason L. Speyer, Claudio Fanti, and Chan Gook Park. "Peak-Seeking Control for Drag Reduction in Formation Flight", Journal of Guidance, Control, and Dynamics, vol. 29, No. 5 (2006), pp. 1221-1230.*

Maziar Sam Hemati, "Vortex-Based Aero- and Hydrodynamic Estimation," Ph.D. Dissertation, UCLA, 2013.*

Sriram Venkataramanan, "Dynamics and Control of Multiple UAVs Flying in Close Proximity," Master's Thesis, University of Textas at Austin, Aug. 2004.*

Ronald J. Ray et al., Flight Test Techniques Used to Evaluate Performance Benefits During Formation Flight, NASA/TP-2002-210730, Aug. 2002.

M. Jake Vachon et al., F/A-18 Performance Benefits Measures During the Autonomous Formation Flight Project, NASA/TM-2003-210734, Sep. 2003.

* cited by examiner

FORMATION FLIGHT CONTROL

GOVERNMENT LICENSE RIGHTS

This invention was made with government support under Contract No. HR0011-10-C-0090 awarded by the Defense Advanced Research Projects Agency. The government has certain rights in the invention.

FIELD

This disclosure relates to aircraft flight control, and more particularly to the control of formation flight characteristics of multiple aircraft.

BACKGROUND

Formation flight may be described as an arrangement of two or more air vehicles or aircraft flying together in a group, usually in a predetermined pattern. The benefits of formation flight may include, but are not limited to, performance advantages including aerodynamic efficiency as a result of a reduction in induced drag and fuel consumption, as well as an increase in payload and range capacity.

Flight control systems exist for controlling and maintaining multiple aircraft in a designated formation during flight. Some flight control systems are configured to enable the exchange of flight data between the aircraft being flown in formation such that the flight characteristics of each aircraft can be controlled according to the flight characteristics of the other aircraft in the formation. Generally, one aircraft in the formation is designated as a lead aircraft with the remaining aircraft being designated as trailing or wingman aircraft. According to some formation flight control systems, the flight characteristics of the trailing aircraft are controlled based on the flight characteristics of the leading aircraft. Some formation flight control systems are designed to control the flight of a trailing aircraft relative to the leading aircraft, such as for mid-air refueling events.

The formation of wake or wingtip vortices trailing behind an aircraft during flight is well known and documented. Generally, when wings are generating lift, air from below the wing is drawn around the wingtips into the region above the wings due to the lower pressure above the wing, which causes a respective vortex to trail from each wingtip. Wingtip vortices cause vortical air patterns behind the aircraft, which can affect the flight of, and be dangerous to, other aircraft and objects positioned within the wake turbulence. For example, the wingtip vortices generated by a leading aircraft may negatively affect the flight of trailing aircraft, as well as disrupting or damaging cargo being dropped by trailing aircraft. The wingtip vortices move under the influence of winds between the leading and trailing aircraft. Close-proximity formation flight systems, however, do not account for the effects of winds on the wingtip vortices because the trailing aircraft is typically close enough to the leading aircraft that the winds have not displaced the wingtip vortices.

During formation flight, some known flight control systems are equipped to estimate the position of wingtip vortices trailing a leading aircraft, and control the flight characteristics of trailing aircraft to avoid the vortices. The position of a wingtip vortex relative to a trailing aircraft is estimated based on the flight characteristics of the leading aircraft and an estimate of the wind generated by the trailing aircraft.

Further, prior systems designed to control the flight of one object relative to another object typically implemented a gradient peak-seeking approach to move the objects relative to each other to maximize or minimize a desired metric. Basically, the gradient peak-seeking approach uses a dither signal to determine a change in relative position to improve the metric. The change is effected, the results analyzed, and the position further updated once again using a dither signal to continually improve the metric.

Although conventional formation flight control systems may attempt to estimate the position of a wingtip vortex and control the position of a trailing aircraft relative to the vortex, the inaccurate estimation of the vortex position leads to inaccurate positioning of the trailing aircraft. Further, previous formation flight control systems fail to accurately track the position commands given to the trailing aircraft because such systems failed to adequately account for vortex-induced aerodynamic effects acting on the trailing aircraft. Additionally, previous formation flight control systems are not configured to prevent un-commanded movement of the trailing aircraft into a wingtip vortex due to vortex-induced air pattern disturbances and position commands. Moreover, although incremental, gradient approaches to peak-seeking may eventually position the objects close to the desired relative position, such an approach is slow, time-consuming, and less responsive.

SUMMARY

The subject matter of the present application has been developed in response to the present state of the art, and in particular, in response to the problems and needs of conventional formation flight control systems that have not yet been fully solved by currently available systems. For example, although conventional formation flight control systems may attempt to estimate the position of a wingtip vortex and control the position of a trailing aircraft relative to the vortex, the inaccurate estimation of the vortex position leads to inaccurate positioning of the trailing aircraft. Further, previous formation flight control systems fail to accurately track the position commands given to the trailing aircraft because such systems failed to adequately account for vortex-induced aerodynamic effects acting on the trailing aircraft. Additionally, previous formation flight control systems are not configured to prevent un-commanded movement of the trailing aircraft into a wingtip vortex due to vortex-induced air pattern disturbances and position commands. Moreover, although incremental, gradient approaches to peak-seeking may eventually position the objects close to the desired relative position, such an approach is slow, time-consuming, and less responsive.

Generally, the subject matter of the present application has been developed to provide a formation flight control system that utilizes an aerodynamic benefit from wingtip vortices to achieve operational benefits, such as improved fuel economy and range, while overcoming at least some of the above-discussed shortcomings of prior art control systems. In contrast to close-proximity formation flight control systems, such as those used for mid-air refueling events, the formation flight control system of the present disclosure controls the flight of a trailing aircraft at a sufficient distance away from the leading aircraft that the wingtip vortex from the leading aircraft is affected by the winds, which can affect the flight of the trailing aircraft. In one implementation, the formation flight control system of the present application provides an accurate estimation of the position of a vortex by reducing the impact of the vortex on the estimation of the wind at the trailing aircraft, and measurement errors associated with sensor bias. Accordingly, the formation flight control system can provide an accurate estimation of the position of the trailing aircraft relative to the vortex, and a determination of a desired position of the trailing aircraft relative to the vortex for utilizing (e.g., maximizing) the operational benefit of the vortex. In one implementation, the formation flight control system of the present application provides robust and accurate tracking of the position commands to ensure accurate positioning of the trailing aircraft into a desired position relative to the vortex. Additionally, in one implementation, the formation flight control system described herein is configured to prevent un-commanded vortex crossings by achieving and robustly maintaining a trailing aircraft in a commanded position relative to a vortex. Moreover, in one embodiment, a peak-seeking approach increases the responsiveness of closing in on a desired relative position by virtue of a Kalman recursion process based on an individual performance metric function.

According to one embodiment, an apparatus for controlling the formation flight of a trailing aircraft relative to a vortex generated by a leading aircraft includes a position module, a desired position module, and a control module. The position module is configured to determine a position of the vortex relative to the trailing aircraft based on an estimate of wind conditions. The estimate of wind conditions is based on at least one air data measurement obtained by the leading aircraft. The desired position module is configured to determine a desired position of the trailing aircraft relative to the vortex for providing desired vortex-induced aerodynamic benefits based on the position of the vortex. Finally, the control module is configured to control flight of the trailing aircraft based on the desired position of the trailing aircraft. In certain implementations, the control module controls flight of the trailing aircraft into the desired position of the trailing aircraft and maintains the trailing aircraft in the desired position of the trailing aircraft.

In some implementations, the at least one air data measurement obtained by the leading aircraft includes measurements taken from a plurality of angle of attack and sideslip vane sensors on the leading aircraft. According to yet some implementations, the estimate of wind conditions is based on at least one of an estimated sideslip angle and an estimated angle of attack of the trailing aircraft (which in some instances can be a measured angle of attack). The estimated sideslip angle can be based on at least one of a position of an aileron of the trailing aircraft, a position of an upper rudder of the trailing aircraft, a position of a lower rudder of the trailing aircraft, a lateral acceleration of the trailing aircraft, a roll rate of the trailing aircraft, and a yaw rate of the trailing aircraft.

According to a second embodiment, an apparatus for controlling the formation flight of a trailing aircraft relative to a vortex generated by a leading aircraft includes a position module that is configured to determine a position of the vortex relative to the trailing aircraft based on an estimator state vector comprising a relative position between the vortex and trailing aircraft. Like the previous embodiment, the apparatus also includes a desired position module that is configured to determine a desired position of the trailing aircraft relative to the vortex for providing desired vortex-induced aerodynamic benefits based on the position of the vortex. The apparatus also includes a control module that is configured to control flight of the trailing aircraft based on the desired position of the trailing aircraft. The position of the vortex can include a lateral position component and a vertical position component. In certain implementations, the control module controls flight of the trailing aircraft into the desired position of the trailing aircraft and maintains the trailing aircraft in the desired position of the trailing aircraft.

In some implementations of the second embodiment, the relative position between the vortex and trailing aircraft includes a relative lateral position of the vortex with respect to the trailing aircraft and a relative vertical position of the vortex with respect to the trailing aircraft. The estimator state vector can include a velocity of the leading aircraft in a lateral direction and a velocity of the leading aircraft in a vertical direction. Additionally, or alternatively, the estimator state vector can include a wind gust component on the vortex in a lateral direction and a wind gust component on the vortex in a vertical direction. Additionally, or alternatively, the estimator state vector can include a delay constant and a strength of the vortex.

According to certain implementations of the second embodiment, the position module is configured to determine the position of the vortex relative to the trailing aircraft based on a measurement vector comprising a plurality of sensed measurements. The plurality of sensed measurements can include a longitudinal position of the leading aircraft relative to the trailing aircraft, a time-delayed lateral position of the leading aircraft relative to the trailing aircraft, a time-delayed vertical position of the leading aircraft relative to the trailing aircraft, a wind gust component acting on the trailing aircraft in the lateral direction, and a wind gust component acting on the trailing aircraft in the vertical direction. In some implementations, the position module determines the position of the vortex relative to the trailing aircraft by recursively updating the estimator state vector individually for each of the plurality of sensed a measurements using a Kalman filter recursion technique. Additionally, or alternatively, in certain implementations, the position module determines the position of the vortex relative to the trailing aircraft based on an estimated vortex-induced component of total body-axes forces acting on the trailing aircraft and an estimated vortex-induced component of a total body-axes moment acting on the trailing aircraft.

In some implementations of the second embodiment, the position module is configured to update the estimator state vector based on a comparison between the position of the vortex relative to the trailing aircraft determined by the position module and at least one actual measurement of the relative position of the trailing aircraft with respect to the vortex. The at least one actual measurement is obtained from output signals of a plurality of angle of attack vanes secured to the trailing aircraft.

According to certain implementations of the second embodiment, the control module is configured to control the flight of the trailing aircraft based on a proportional-integral-derivative architecture. In yet some implementations of second embodiment, the control module is configured to control the flight of the trailing aircraft based on a crosstrack rate feedback value. In certain implementations of the second embodiment, the control module is configured to control the flight of the trailing aircraft based on at least one of a roll feedback value, a rudder feedback value, and a sideslip feedback value.

In a third embodiment, an apparatus for controlling the formation flight of a trailing aircraft relative to a vortex generated by a leading aircraft includes a position module that is configured to determine a position of the vortex relative to the trailing aircraft, and a desired position module that is configured to determine a desired position of the trailing aircraft relative to the vortex for providing desired vortex-induced aerodynamic benefits based on the position of the vortex. The apparatus also includes a control module configured to control flight of the trailing aircraft based on the desired position of the trailing aircraft by generating at least one command. Additionally, the apparatus includes a limiter module that is configured to monitor the at least one command generated by the control module and modify the at least one command into at least one modified command to avoid unintended crossings of the trailing aircraft into the vortex. In certain implementations, the control module controls flight of the trailing aircraft into the desired position of the trailing aircraft and maintains the trailing aircraft in the desired position of the trailing aircraft.

According to some implementations of the third embodiment, the limiter module modifies the at least one command into the at least one modified command by limiting one of a crosstrack position of the trailing aircraft and a velocity of the trailing aircraft in the crosstrack direction. The limiter module can modify the at least one command into the at least one modified command when a parameter being limited meets a threshold. The limiter module can limit a velocity of the trailing aircraft in a crosstrack direction as a function of a position of the trailing aircraft relative to a core of the vortex in the crosstrack direction. As the position of the trailing aircraft relative to the core of the vortex in the crosstrack direction decreases, an allowed velocity of the trailing aircraft in the crosstrack direction can be reduced.

In some implementations of the third embodiment, the limiter module modifies the at least one command via a low-pass filter with one-side rate-saturation. In the same or alternative implementations, the limiter module modifies the at least one command when the trailing aircraft is moving toward the vortex, and does not modify the at least one command when the trailing aircraft is moving away from the vortex. Additionally, in the same or alternative implementations, the limiter module modifies the at least one command when a threshold is met, and stops modifying the at least one command after the threshold ceases to be met. The limiter module is configured to control a rate at which the at least one modified command returns to the at least one command after the threshold ceases to be met via a one-sided low-pass filter.

According to a fourth embodiment, an apparatus for controlling the formation flight of a trailing aircraft relative to a vortex generated by a leading aircraft includes a position module that is configured to determine a position of the vortex relative to the trailing aircraft. The apparatus also includes a peak-seeking module that is configured to determine a desired position of the trailing aircraft for providing desired vortex-induced aerodynamic benefits based on the position of the vortex relative to the trailing aircraft and a mapping function of an individual performance metric. Additionally, the apparatus includes a control module that is configured to control flight of the trailing aircraft based on the desired position of the trailing aircraft. In certain implementations, the control module controls flight of the trailing aircraft into the desired position of the trailing aircraft and maintains the trailing aircraft in the desired position of the trailing aircraft.

In some implementations of the fourth embodiment, the individual performance metric is a function of the position of the trailing aircraft relative to the vortex. According to certain implementations of the fourth embodiment, the peak-seeking module estimates a shape of a quadratic model patterned within a region defined by a search pattern comprising a plurality of estimated values of an element of an estimator state vector. Each estimated value is associated with a separate evaluation of the mapping function for each of a plurality of different variable values. A bottom of the estimated shape of the quadratic model defines either a minimum or maximum value of the element of the estimator state vector. The desired position of the trailing aircraft is based on the minimum value or maximum value of the element depending on whether the bottom is associated with a minimum value or maximum value. Accordingly, when used below, a minimum value can be replaced with a maximum value depending on the metric being analyzed. The estimated shape of the quadratic model can be a first estimated shape, the search pattern can be a first search pattern, and the minimum value of the element can be a first minimum value of the element. The peak-seeking module may estimate a second shape of the quadratic model patterned within a region defined by a second search pattern positioned locally about the minimum value of the element. The second shape of the quadratic model can be smaller than the first shape of the quadratic model and the second search pattern can be smaller than the first search pattern. A bottom of the second estimated shape of the quadratic model may define a second minimum value of the element and the desired position of the trailing aircraft can be revised according to the second minimum value of the element.

In some implementations of the fourth embodiment, the peak-seeking module evaluates the mapping function according to a recursion scheme for each element of an estimator state vector. For each element of the estimator state, the peak-seeking module determines an estimated value of the element, an estimated optimal position error, and an uncertainty factor representing a prediction of how close the estimated value of the element is to an actual value of the element. The peak-seeking module determines the desired position of the trailing aircraft based on the estimated state vector and the estimated optimal position error. The peak-seeking module can determine the estimated value of the element by generating a search pattern comprising a plurality of estimated values of the element. The peak-seeking module can be configured to scale the size of search pattern based on the uncertainty factor.

In yet a fifth embodiment, an apparatus for controlling the formation flight of a trailing aircraft relative to a vortex generated by a leading aircraft includes a position module, peak-seeking module, limiter module, and control module. The position module is configured to determine a position of the vortex relative to the trailing aircraft based on an estimate of the wind conditions at the leading aircraft and an estimator state vector comprising a relative position between the vortex and the trailing aircraft. The peak-seeking module is configured to determine a desired position of the trailing aircraft for providing desired vortex-induced aerodynamic benefits based on the position of the vortex relative to the trailing aircraft and a mapping function of an individual performance metric. The limiter module is configured to monitor the system states and the desired position of the trailing aircraft and modify the desired position of the trailing aircraft into a modified desired position of the trailing aircraft to avoid unintended crossings of the trailing aircraft into the vortex. Finally, the control module is configured to control flight of the trailing aircraft based on one of the desired position of the trailing aircraft and modified desired position of the trailing aircraft. In certain implementations, the control module controls flight of the trailing aircraft into the one of the desired and modified desired positions of the trailing aircraft and maintains the trailing aircraft in the one of the desired and modified desired positions of the trailing aircraft.

In certain embodiments, the modules of the apparatus described herein may each include at least one of logic hardware and executable code, the executable code being stored on one or more memory devices. The executable code may be replaced with a computer processor and computer-readable storage medium that stores executable code executed by the processor.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
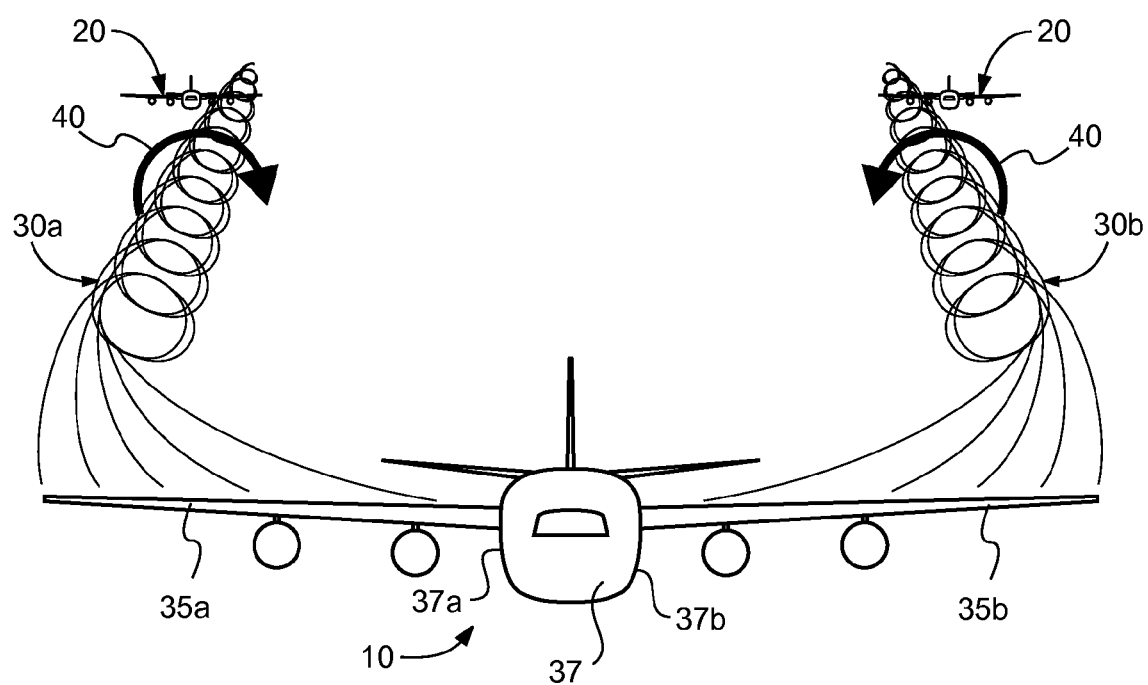
FIG. 1 is a front view of trailing aircraft flying in formation with a leading aircraft relative to a vortex produced by the leading aircraft according to one embodiment.
Figure 2A:
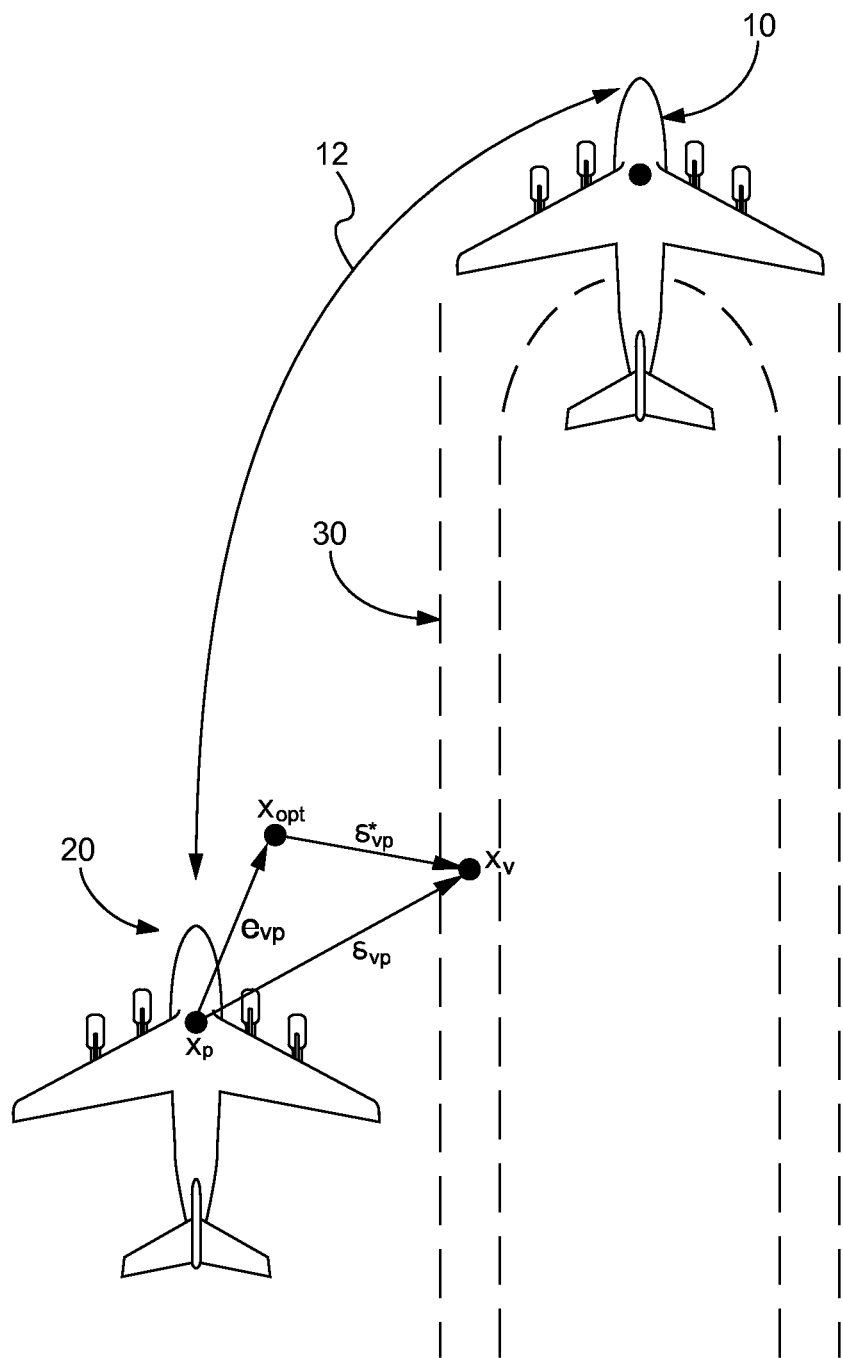
FIG. 2A is a top plan view of a trailing aircraft flying in formation with a leading aircraft relative to a vortex produced by the leading aircraft according to one embodiment.
Figure 2B:
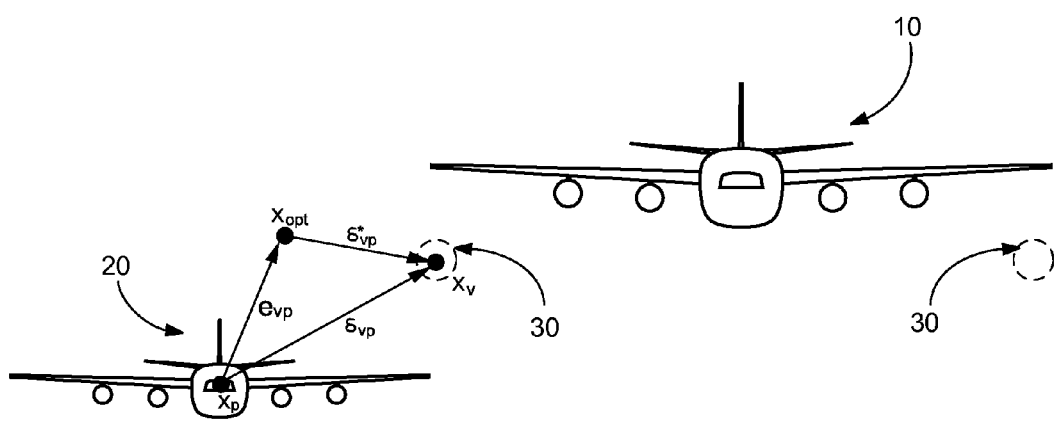
FIG. 2B is a front view of a trailing aircraft flying in formation with a leading aircraft relative to a vortex produced by the leading aircraft according to one embodiment.

With reference to FIGS. 1 and 2, described herein is one embodiment of a formation flight control system that utilizes the aerodynamic benefit from a wingtip vortex 30 generated by a leading aircraft 10 to achieve operational benefits for a trailing aircraft 20. Generally, a wingtip vortex 30, or wake as also used herein, is a circular pattern of rotating air trailing a wingtip as the wing 35 generates lift. In this regard, as shown in FIG. 1, the leading aircraft 10 may include a first wing 35a positioned on a first side 37a of a fuselage 37 of the leading aircraft 10 to generate a first vortex 30a, and a second wing 35b positioned on a second side 37b of the fuselage 37 of the leading aircraft 10 to generate a second vortex 30b, collectively disclosed herein as vortices. As such, as disclosed herein, any reference in the detailed description to a vortex 30 applies equally to the first vortex 30a and/or the second vortex 30b.

Because the swirling motion of a vortex has a generally circular pattern, upwardly directed portions 40 of the swirling air can provide updraft forces. Moreover, the wingtip vortex 30 swirls from the wingtip such that the upwardly directed portion 40 of the vortex 30 emitted from the leading aircraft 10 is located at the outward side of the vortex or at the side of the vortex farthest away from the fuselage 37 of the leading aircraft 10.

Because of the positioning of the upwardly directed portion 40 of the vortex 30, the trailing aircraft 20 can approach the vortex from a trailing position outside of the vortex, and be positioned at least partially within the upwardly directed portion 40 of the vortex. In such a position, the updraft forces generated by the upwardly directed portion 40 impact the trailing aircraft 20 to at least partially buoy or lift the trailing aircraft. In this manner, with the trailing aircraft 20 in a desired position, the vortex 30 provides an aerodynamic benefit to the trailing aircraft 20 in the form of operational benefits, such as increased fuel economy and flight range. However, if the trailing aircraft 20 is improperly positioned relative to the location of the vortex 30, the vortex 30 can have a negative effect on the aerodynamics and operational characteristics of the trailing aircraft. Additionally, a vortex 30 may impart forces (e.g., a sideforce) and moments (e.g., a yaw moment) on the trailing aircraft 20 that vary in strength based on the position of the trailing aircraft 20 relative to the vortex 30, which must be overcome to maintain the trailing aircraft in the desired position relative to the vortex 30. Accordingly, accurately predicting the location of the vortex 30 and the trailing aircraft 20 relative to the vortex 30, stably controlling the trailing aircraft 20 into a desired position relative to the vortex 30 to achieve the aerodynamic benefits of the vortex 30, avoiding negative aerodynamic consequences caused by unintended movement of the trailing aircraft into the vortex 30, and other functionality may be desirable.

Figure 3:
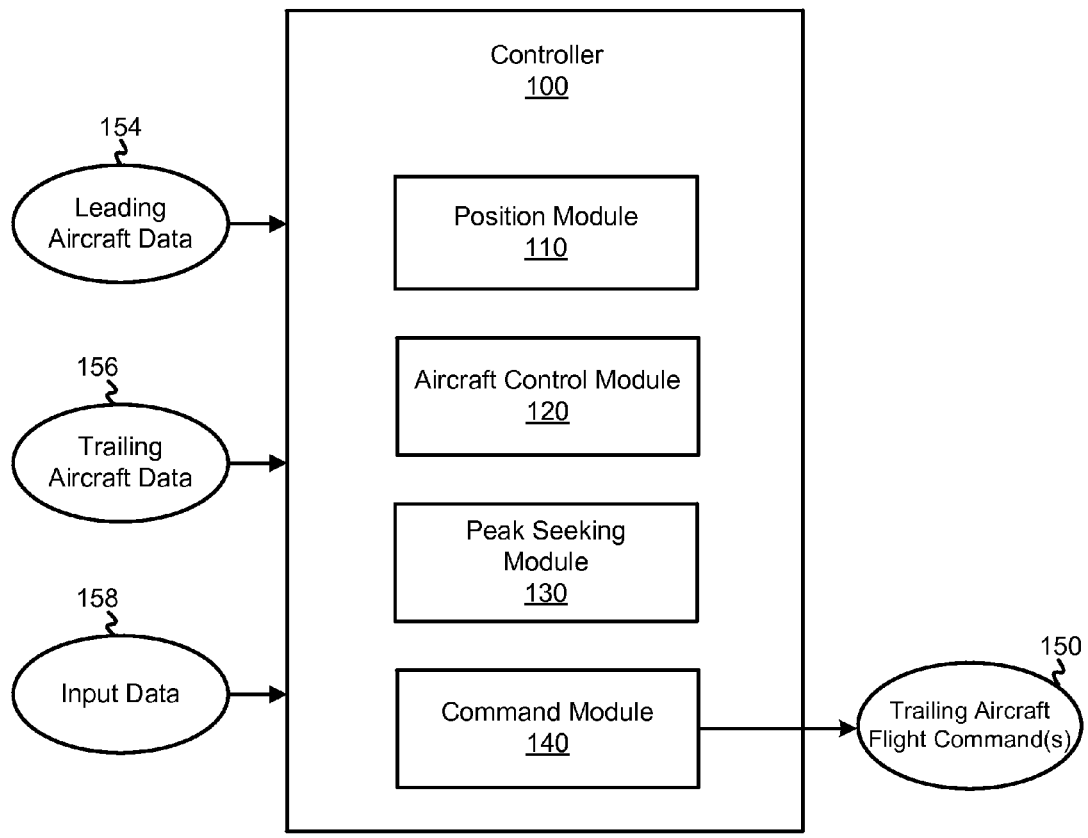
FIG. 3 is a schematic block diagram of a flight controller configured to control formation flight according to one embodiment.

Described herein is a flight control system that achieves one or more of the above-mentioned desirable functions associated with utilizing a vortex 30 for aerodynamic and operational benefits during flight. Referring to FIG. 3, according to one embodiment, a flight control system includes a controller 100 configured to control the flight of the trailing aircraft 20 to achieve the desirable functions related to vortex utilization. Generally, the controller 100 receives multiple inputs, processes the inputs, and generates multiple outputs. The multiple inputs may include sensed measurements from the sensors, operating condition estimations from virtual sensors, and various user inputs. In one implementation, the inputs include leading aircraft data 154, trailing aircraft data 156, and input data 158. The leading aircraft data 154 (e.g., data that may be used to estimate wind conditions) can be transmitting from the leading aircraft 10 and received by the trailing aircraft 20 via a data link 12, which can be any of various types of data links known in the art. The inputs are processed by the controller 100 using various algorithms, stored data, and other inputs to update the stored data and/or generate output values. In one implementation, the controller 100 outputs trailing aircraft flight command(s) 150, which can be a roll command and/or altitude command. The generated output values and/or commands 150 are utilized by other components or modules of the controller and/or one or more elements of the trailing aircraft 20 to control the flight of the trailing aircraft to achieve desired results.

The controller 100 includes various modules and stores information for controlling the operation of the trailing aircraft 20. For example, as shown in FIG. 3, the controller 100 includes a position module 110, an aircraft control module 120, a peak-seeking module 130, and a command module 140. Generally, the modules 110, 120, 130, and 140 cooperate to generate a navigation solution (including at least one trailing aircraft flight command 150 (e.g., roll and altitude commands) relative to the leading aircraft 10 based on one or more of the data 154, 156, 158. Although the controller 100 is shown as a single unit including all the modules 110, 120, 130, 140, in some embodiments, the controller 100 can include several units in communication with each other, with each unit including one or more of the modules. Further, the units of a multi-unit controller need not be physically proximate to each other, and in fact can be remote from each other, but remain in communication with each other as necessary to perform the functionality of the modules.

In one embodiment, the controller 100 is located onboard the trailing aircraft 20. However, in some embodiments, the controller 100, or one or more units or modules of the controller, may be located remote from the trailing aircraft 20. For example, one or more units or modules of the controller 100 can be located onboard the leading aircraft 20 or at a ground control station. When located remotely of the trailing aircraft 20, the controller 100, or remotely located units or modules of the controller, may be communicable with the leading aircraft via various communication protocols, such as IR, wireless, radio, and the like.

Figure 4:
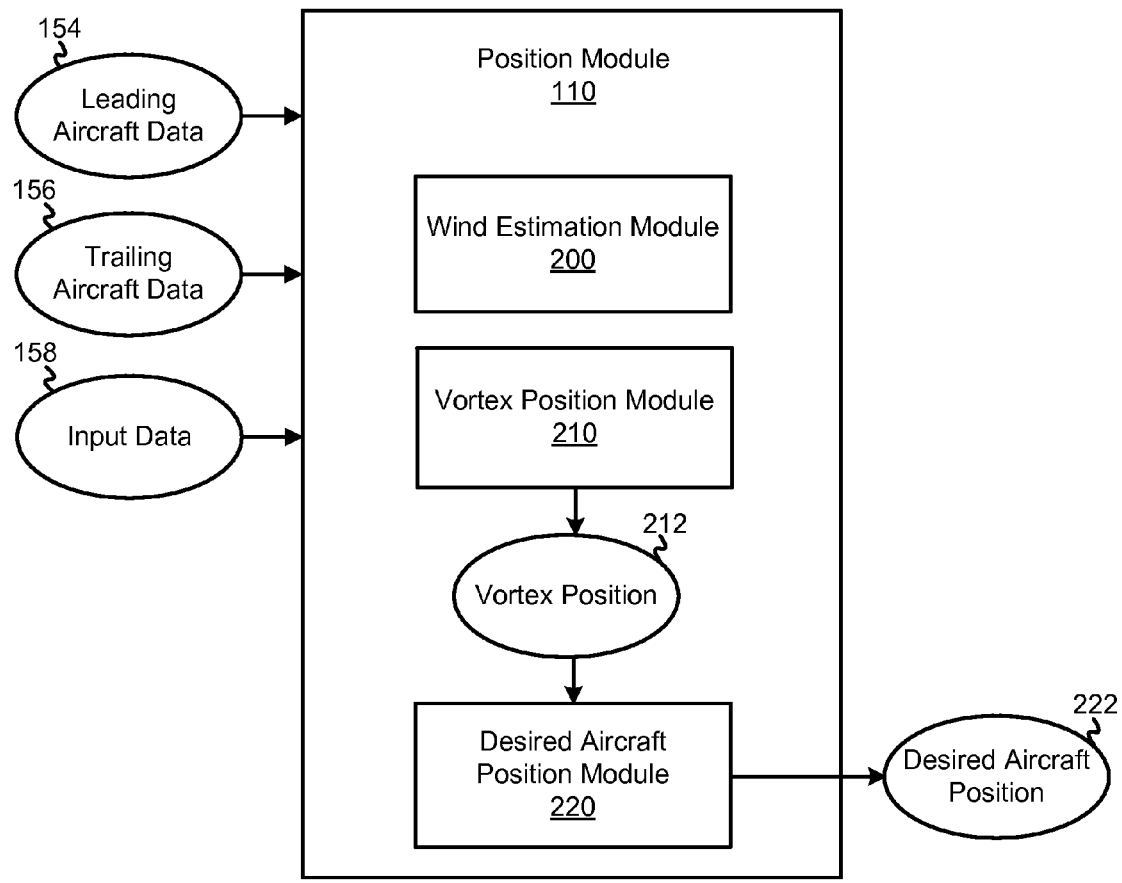
FIG. 4 is a schematic block diagram of a position module of the flight controller configured to determine a vortex position and desired aircraft position according to one embodiment.

Referring to FIGS. 3 and 4, the position module 110 of the controller 100 is configured generally to determine a position of the vortex 30, a position of the trailing aircraft 20 relative to the vortex 30, and a desired position of the trailing aircraft 20 relative to the vortex 30. The positions determined by the position module 110 are based directly or indirectly on the leading aircraft data 154, trailing aircraft data 156, and an estimate of the wind conditions. According to prior art systems, estimates of the wind conditions were calculated according to air data measurements from the trailing aircraft. However, the vortices 30 induced by the leading aircraft 10 tend to corrupt the air data measurements from the trailing aircraft 20. Prior art formation flight systems were not designed for operation of the trailing aircraft within the vortices. Accordingly, prior art systems did not compensate for air data corruption associated with operation within the vortices, and thus did not provide accurate estimations of the wind, which led to inaccurate estimations of the position of the vortices 30 and the position of the trailing aircraft relative to a vortex.

To account for the corrupting effect of vortices 30 on the air data measurements obtained by the trailing aircraft 20, the position module 110 includes a wind estimation module 200 that utilizes air data measurements obtained by the leading aircraft 10. Generally, the wind estimation module 200 estimates the trailing aircraft's movement relative to the air, and subtracts this estimate from the aircraft's movement relative to the earth (which can be obtained from an on-board navigation system). Because the air mass proximate the leading aircraft 10 is relatively unaffected by the turbulence-inducing effects of the vortices 30, the air data measurements obtained by the leading aircraft 10 provide a more accurate estimation of the wind conditions, and thus a more accurate estimation of the position of the vortices 30 and the trailing aircraft relative to the vortices.

In addition to air data measurements from the leading aircraft 10, the wind estimation module 200 estimates the wind conditions based on an estimated sideslip angle $\hat{\beta}$ of the trailing aircraft 20. Aircraft sideslip may lead to overestimating the magnitude of cross-winds on the vortex 30 and trailing aircraft 20. Accordingly, sideslip should be a factor in the estimation of the wind conditions to enhance the estimate of the winds. Aircraft sideslip can be defined in terms of an estimated sideslip angle $\hat{\beta}$, which can be calculated according to any of various techniques and methods as desired. According to one embodiment employing one technique, the sideslip angle $\hat{\beta}$ of the trailing aircraft 20 can be estimated based on the following equations:

$$Cy = Wa_y/(qS_{ref}) \qquad (1)$$

$$\hat{\beta} = (Cy - Cy_p p - Cy_r r - Cy_{\delta a}\delta a - Cy_{\delta ru}\delta ru - Cy_{\delta rl}\delta rl)/Cy_\beta \qquad (2)$$

where Cy is the total aerodynamic side-force contribution acting on the trailing aircraft 20, W is the gross weight of the trailing aircraft, $a_y$ is the lateral acceleration of the trailing aircraft, q is the dynamic pressure, S is the wing reference area of the trailing aircraft, $Cy_p$ is the side-force contribution associated with the roll rate p of the trailing aircraft, $Cy_r$ is the side-force contribution associated with the yaw rate r of the trailing aircraft, $Cy_{\delta a}$ is the side-force contribution associated with the aileron position $\delta a$ of the trailing aircraft, $Cy_{\delta ru}$ is the side-force contribution associated with the upper rudder position $\delta ru$ of the trailing aircraft, $Cy_{\delta rl}$ is the side-force contribution associated with the lower rudder position $\delta rl$ of the trailing aircraft, and $Cy_\beta$ is the side-force contribution associated with the estimated side-slip angle $\hat{\beta}$ of the trailing aircraft. In some implementations, the side-force contributions from Equation 2 may be obtained from look-up tables stored on the controller 100 or other storage device.

In one implementation, the wind estimation module 200 estimates the wind conditions based on a relationship between the velocity of the trailing aircraft 20 relative to the airmass in body frame, the inertial velocity of the trailing aircraft, and the velocity of the airmass. For example, the wind velocity vector $\vec{V}_W^{NED}$ can be determined from the following $$\vec{V}_A^B = C_{NED}^B \{C_N^{NED}\vec{V}^N - \vec{V}_W^{NED}\} \qquad (3)$$

where $\vec{V}_A^B$ is the true airspeed vector in body frame (B), $C_{NED}^B$ is a direction cosine matrix from local North-East-Down frame (NED) to body frame, $C_N^{NED}$ is a direction cosine matrix from the navigation frame (N) to the local NED, and $\vec{V}^N$ is the velocity of the trailing aircraft relative to the earth in navigation coordinates. The estimated sideslip angle $\hat{\beta}$ and the angle of attack $\alpha$ are embedded in the true airspeed vector $\vec{V}_A^B$ according to the following relationship $$\vec{V}_A^B = V_A \begin{bmatrix} \cos\alpha\cos\hat{\beta} \\ \sin\hat{\beta} \\ \sin\alpha\cos\hat{\beta} \end{bmatrix} \quad (4)$$

where $V_A$ is the true airspeed. For additional accuracy, in some embodiments, the measured angle of attack $\alpha$, which can be based on inaccurate outputs from measurement vanes on the trailing aircraft 20, can be replaced with an estimated angle of attack $\hat{\alpha}$, which can be calculated according to any of various techniques and methods as desired.

The estimated wind conditions (e.g., the wind velocity vector $\vec{V}_W^{NED}$) are used by the vortex position module 210 to determine the position of the vortex 30. Further, by knowing the position of the trailing aircraft 20, the position of the trailing aircraft relative to the position of the vortex can be determined. Generally, the estimated wind conditions help to diagnose the direction and magnitude of a shift of the vortex 30 within the airmass caused by cross-winds. The vortex position module 210 generates a vortex position 212 that is utilized by a desired aircraft position module 220 of the position module 110 to determine a desired aircraft position of the trailing aircraft 20.

The desired aircraft position module 220 is configured to determine a position of the trailing aircraft 20 relative to the vortex 30 that will achieve a desired aerodynamic and operational benefit from the updraft 40 generated by the vortex 30. The desired aircraft position module 220 generates a desired aircraft position 222 representing the desired position determined by the desired aircraft position module. The desired aircraft position 222 is utilized by the aircraft control module 120 to determine position demands, or position commands, which are used to generate a flight control scheme (e.g., flight commands) by the command module 140 to position the trailing aircraft 20 into the desired position. The desired aircraft position can be determined by the desired aircraft position module 220 based on the vortex position 212 and a wake propagation model incorporating known physical characteristics of vortices. Alternatively, or cooperatively, in some embodiments, the desired aircraft position module 220 generates the desired aircraft position 222 based on the vortex position 212 and input from a pilot controlling the flight of the trailing aircraft 20. For example, the pilot may be alerted to the vortex position 212, and manually enter the desired aircraft position 222 in the form of position commands or coordinates. The desired aircraft position module 220 may also be incorporated into the peak-seeking module 130, which determines a desired aircraft position 222 and generates position commands based at least partially on the desired aircraft position and a peak-seeking algorithm as will be explained in more detail below.

In some alternative embodiments, the position module 110 determines the position 212 of the vortex 30, which facilitates an estimation of the position of the trailing aircraft 20 relative to the vortex or vice versa. The estimation scheme is based on operating condition measurements that are not directly influenced by the position of the wake relative to the trailing aircraft 20. In one implementation, the position of the vortex 30 (i.e., $p_w(t)$) is approximated according to the following relationship $$p_w(t) = \begin{bmatrix} p_{w,l}(t) \\ p_{w,c}(t) \\ p_{w,v}(t) \end{bmatrix} \approx p_l(t-\tau) + \int_{-\tau}^{0} \begin{bmatrix} 0 \\ 0 \\ 1 \end{bmatrix} \frac{\Gamma}{2\pi b_0} + y \bigg|_{g,w} (t)ds \quad (5)$$

where $p_{w,l}(t)$, $p_{w,c}(t)$, and $p_{w,v}(t)$ are the longitudinal, crosstrack, and vertical coordinates of the vortex, $p_l$ is the position of the leading aircraft, $\tau$ is the amount of time the trailing aircraft 20 is behind the leading aircraft 10, $\Gamma$ is the strength of the vortex 30, $b_0$ is a characteristic span, and $y_{g,w}(t)$ represents a wind gust model associated with wake propagation dynamics. Accordingly, in some embodiments, Equation 5 can be utilized to determine the vortex position 212 and the position of the trailing aircraft 20 relative to the vortex 30. Referring to Equation 5, it is noted that the vortex position vector $p_w(t)$ includes a vertical coordinate, which accounts for a vertical descent of the vortex and facilitates proper vertical positioning and altitude tracking of the trailing aircraft 20 relative to the vortex 30. Conventional formation flight controls do not account for vortex descent and are concerned only with crosstrack positioning by assuming a co-altitude position relative to the leading aircraft 10 and vortex 30. In some embodiments, the same set of measurements associated with Equation 5 can be utilized to achieve a smoother, and perhaps more accurate, estimate of the position of the trailing aircraft 20 relative to the vortex 30 if desired as will now be described. Further, in yet some embodiments, additional measurements may be used to further improve the accuracy of the estimate of the position of the trailing aircraft 20 relative to the vortex 30 as will be described in more detail below.

By assuming constant values for $\tau$, $\Gamma$, and $b_0$, and taking a time-based derivative, Equation 3 can be reduced to $$\dot{p}_w(t) \approx v_l(t-\tau) + \tau \dot{y}_{g,w}(t) \quad (6)$$

where $v_l$ is the velocity of the leading aircraft 10. From Equation 6, the relative location of the vortex 30 with respect to the trailing aircraft 20 (i.e., $p_{rel}(t)$) can be determined based on the following definition of relative location and taking a time derivative of the relative location as follows $$p_{rel}(t) = p_w(t) - p_t(t) \quad (7)$$

$$\dot{p}_{rel}(t) = \dot{p}_w(t) - \dot{p}_t(t) \quad (8)$$

$$\dot{p}_{rel}(t) = v_l(t-\tau) + \tau \dot{y}_{g,w}(t) - v_t(t) \quad (9)$$

where $v_t$ is the velocity of the trailing aircraft 20. Each of the variables of Equation 9 can be directly measured in some implementations. Yet in other implementations, one or more of the variables of Equation 9 are estimated.

Assuming the availability of accurate physical or virtual measurements for the relative position of the trailing aircraft 20 with respect to the leading aircraft 10, the vertical and crosstrack components of the inertial velocity of the trailing aircraft 20, and the vertical and crosstrack components of the wind (which can be obtained from the wind estimation module 200), and the total airspeed or velocity of the trailing aircraft (which can be assumed to be approximately equal to the airspeed of the leading aircraft), an estimator state vector $\hat{x}$ may be represented by $$\hat{x} = \begin{bmatrix} v_{l,xtrk}(t-\tau) \\ v_{l,alt}(t-\tau) \\ p_{rel,xtrk}(t) \\ p_{rel,alt}(t) \\ \tau(t) \\ \Gamma(t) \\ y_{g,xtrk}(t) \\ y_{g,alt}(t) \end{bmatrix} = \begin{bmatrix} v_l(t-\tau) \\ p_{rel} \\ \tau \\ \Gamma \\ y_g \end{bmatrix} \quad (10)$$

where $v_{l,xtrk}$ is equal to the velocity of the leading aircraft 10 in the crosstrack or lateral direction, $v_{l,alt}$ is equal to the velocity of the leading aircraft 10 in the vertical direction, $p_{rel,xtrk}$ is the relative crosstrack or lateral position of the vortex 30 with respect to the trailing aircraft 20, $p_{rel,alt}$ is the relative vertical position of the vortex with respect to the trailing aircraft, $\tau(t)$ is the delay constant with respect to time, $\Gamma(t)$ is the strength of the vortex with respect to time, $y_{g,xtrk}(t)$ is the wind gust component on the vortex in the lateral crosstrack direction, and $y_{g,alt}(t)$ is the wind gust component on the vortex in the vertical direction. The estimator state vector $\hat{x}$ represented by Equation 10 drives the accuracy and robustness of the vortex position module 210 in determining the position of the vortex 30. In some implementations, the estimator state vector $\hat{x}$ includes fewer or more than eight components. In one implementation, the estimator state vector $\hat{x}$ includes only the crosstrack velocity $v_{l,xtrk}$, the vertical velocity $v_{l,alt}$ the relative crosstrack position $p_{rel,xtrk}$ and the relative vertical position $p_{rel,alt}$. In other implementations, the estimator state vector $\hat{x}$ includes only the crosstrack velocity $v_{l,xtrk}$, the vertical velocity $v_{l,alt}$ the relative crosstrack position $p_{rel,xtrk}$, the relative vertical position $p_{rel,alt}$, crosstrack wind gust component $y_{g,xtrk}(t)$, and vertical wind gust component $y_{g,alt}(t)$. In yet certain implementations, the estimator state vector includes only the relative crosstrack position $p_{rel,xtrk}$ and the relative vertical position $p_{rel,alt}$.

The estimator state vector $\hat{x}$ of Equation 10 may be associated with linear dynamics and non-linear measurement equations to yield a Jacobian matrix useful for determining the position of the vortex 30. The linear dynamics may be represented by $$\dot{\hat{x}} = \begin{bmatrix} 0 & 0 & 0 & 0 & 0 \\ 1 & 0 & 0 & 0 & 0 \\ 0 & 0 & 0 & 0 & 0 \\ 0 & 0 & 0 & 0 & 0 \\ 0 & 0 & 0 & 0 & 0 \end{bmatrix} x + \begin{bmatrix} 0 \\ -v_t(t) \\ 0 \\ 0 \\ 0 \end{bmatrix} + w(t) \quad (11)$$

and the non-linear measurement equation or vector can be represented by $$y = \begin{bmatrix} p_{l,long}(t) \\ p_{l,xtrk}(t-\tau) \\ p_{l,alt}(t-\tau) \\ y_{g,xtrk}(t) \\ y_{g,alt}(t) \end{bmatrix} \approx \begin{bmatrix} V_{air}\tau \\ p_{rel,xtrk}(t) - \tau y_{g,xtrk} \\ p_{rel,alt}(t-\tau) - \tau\frac{\Gamma}{2\pi b_0} - \tau y_{g,alt} \\ y_{g,xtrk}(t) \\ y_{g,alt}(t) \end{bmatrix} \quad (12)$$

which when combined with Equations 10 and 11 yields the Jacobian matrix Hx represented as follows $$Hx = \frac{\partial y}{\partial x} x \quad (13)$$

$$= \begin{bmatrix} 0 & 0 & 0 & 0 & V_{air} & 0 & 0 & 0 \\ 0 & 0 & 1 & 0 & 0 & 0 & -\tau & 0 \\ 0 & 0 & 0 & 1 & -\frac{\Gamma}{2\pi b_0} & -\frac{\tau}{2\pi b_0} & 0 & -\tau \\ 0 & 0 & 0 & 0 & 0 & 0 & 1 & 0 \\ 0 & 0 & 0 & 0 & 0 & 0 & 0 & 1 \end{bmatrix} \begin{bmatrix} v_{l,xtrk}(t-\tau) \\ v_{l,alt}(t-\tau) \\ p_{rel,xtrk}(t) \\ p_{rel,alt}(t) \\ \tau(t) \\ \Gamma(t) \\ y_{g,xtrk}(t) \\ y_{g,alt}(t) \end{bmatrix}$$

which can be converted into a discrete-time representation. The measurement vector of Equation 12 is obtained by modifying the raw measurement data received from associated sensors on the leading and/or trailing aircrafts. For example, the raw measurement data can be transformed into a desired coordinate frame, and the leader position measurements can be delayed by the delay constant $\tau$. The measurement vector of Equation 12 of the illustrated embodiment includes five sensed measurements with respect to time (e.g., the longitudinal position of the leading aircraft relative to the trailing aircraft $p_{l,long}(t)$, the time-delayed lateral or crosstrack position of the leading aircraft relative to the trailing aircraft $p_{l,xtrk}(t-\tau)$, the time-delayed vertical position of the leading aircraft relative to the trailing aircraft $p_{l,alt}(t-\tau)$, the wind gust component acting on the trailing aircraft in the lateral or crosstrack direction $y_{g,xtrk}(t)$, and the wind gust component acting on the trailing aircraft in the vertical direction $y_{g,alt}(t)$) but can include more than five sensed measurements as will be explained in more detail below. The five measurements of the measurement vector of Equation 12 are not direct measurements of vortex effects on the trailing aircraft 20 (e.g., the five measurements are associated with characteristics that behave independently of the effects of the vortex). Once the measurement vector of Equation 12 is populated by the appropriately modified measured data, the estimator state vector $\hat{x}$ represented by Equation 10 is maintained and updated by the vortex position module through application of an error covariance matrix and taking discrete-time Kalman filter recursions by recursively propagating Equations 14 and 15 below and updating Equations 16 and 17 below $$\hat{x}_k^- = f(\hat{x}_{k-1}) \quad (14)$$

$$\Sigma_{\hat{x}_k}^- = F\Sigma_{\hat{x}_{k-1}}F^T + \Sigma_w \quad (15)$$

$$\hat{x}_k = \hat{x}_k^- + \Sigma_{\hat{x}_k}^- H^T(H\Sigma_{\hat{x}_k}^- H^T + \Sigma_v)^{-1}(y_k - h(\hat{x}_k^-)) \quad (16)$$

$$\Sigma_{\hat{x}_k} = \Sigma_{\hat{x}_k}^- - \Sigma_{\hat{x}_k}^- H^T(H\Sigma_{\hat{x}_k}^- H^T + \Sigma_v)^{-1}H\Sigma_{\hat{x}_k}^- \quad (17).$$

In some implementations, Equations 16 and 17 are updated at each time step for one of the five measurements of the measurement vector of Equation 12. In other words, Equations 16 and 17 can be updated one measurement at a time, as opposed to being updated in bulk with all of the five measurements. Updating the Equations 16 and 17 on a per measurement basis provides flexibility in selecting which measurements are considered first, and how many measurements are included in the measurement vector of Equation 12. Additionally, updating Equations 16 and 17 based on a per-measurement approach allows selectable subsets of the five measurements to be considered at a given time step, and the remaining measurements at subsequent time steps.

Advantageously, the above-described vortex position determination scheme does not require sensed measurements of the vortex effects on the trailing aircraft 20. Accordingly, an expected nominal dynamic behavior of the leading and trailing aircraft 10, 20 can be used to estimate the position of the vortex 30 by utilizing the five-component measurement vector of Equation 12. However, because the measurement vector of Equation 12 does not include measurement data of the vortex effects on the trailing aircraft 20, the vortex position determination scheme does not account for measurement biases (e.g., wind measurement biases) or modeling errors (e.g., inaccurate initial calculation of the vortex strength Γ) associated with the vortex effects that may contribute to a vortex position estimate with a lower level of accuracy. Accordingly, in some embodiments, the above-described vortex position determination scheme can be supplemented with additional modeling and measurements to account for the effects of the vortex dynamics acting on the trailing aircraft 20. Essentially, the additional modeling and measurements assist in estimating the position of the vortex 30 or the position of the trailing aircraft 20 relative to the vortex by "feeling" the aerodynamic forces and moments due to the vortex.

In one embodiment, the above-described vortex position determination scheme is supplemented with additional modeling to account for the effects of the vortex dynamics acting on the trailing aircraft 20. More specifically, the vortex position module 210 models the incremental forces and moments of the vortex acting on the trailing aircraft 20 as a function of relative position. The translational acceleration $\dot{v}_B^B$ and angular acceleration $\dot{\omega}^B$ of the trailing aircraft 20 can be determined from $$\dot{v}_B^B = \frac{F_{Total}^B}{m} + g^B - \omega^B \times v_B^B \quad (18)$$

$$\dot{\omega}^B = J^{-1}[M_{Total} - [\omega^B \times]J\omega^B] \quad (19)$$

where $F_{Total}^B$ is the total body-axes forces acting on the trailing aircraft 20, m is the mass of the trailing aircraft, $g^B$ is the gravitational force acting on the body of the trailing aircraft, $\omega^B$ is the angular velocity of the trailing aircraft, $v_B^B$ is the velocity of the trailing aircraft, J is a body-axis inertia matrix, and $M_{total}$ is the total body-axes moment acting on the trailing aircraft. The total body-axes forces $F_{Total}^B$ and moment $M_{total}$ can be reduced to nominal and vortex-induced components, such that the body-axes forces due to the wake $F_{wake}^B$ and the body-axes moment due to the wake $M_{wake}$ can be represented by $$F_{wake}^B = \underbrace{m(\dot{v}_B^B - g^B + \omega^B \times v_B^B)}_{F_{Total}^B} - F_{nom}^B \quad (20)$$

$$M_{wake} = \underbrace{J\dot{\omega}^B + [\omega^B \times]J\omega^B}_{M_{Total}} - M_{nom} \quad (21)$$

The total body-axes forces $F_{Total}^B$ and moment $M_{total}$ can be computed based on measurements taken by an inertial measurement unit on the trailing aircraft 20 and known properties of the mass of the trailing aircraft. The nominal forces and moment $F_{nom}^B$, $M_{nom}$ are determined based on a model of the trailing aircraft 20 that includes the aerodynamics and factors dependent on surface deflections and engine output. Equations 20 and 21 can be incorporated into a synthetic measurement of incremental forces and moments as follows $$y_{FM_i} = h_{FM_i}(x) = [FM_i(p_{rel,c}, p_{rel,v}, \Gamma)] \quad (22)$$

$$\Rightarrow H_{FM_i} = \frac{\partial h_{FM_i}}{\partial x} \quad (23)$$

$$= \begin{bmatrix} 0 & 0 & \frac{\partial FM_k}{\partial p_{rel,c}} & \frac{\partial FM_i}{\partial p_{rel,v}} & 0 & \frac{\partial FM_i}{\partial \Gamma} & 0 & 0 \end{bmatrix}$$

which express each of the six incremental forces/moments as a function of the relative position of the trailing aircraft 20 with respect to the vortex 30, and include signals that can be used as additional inputs to the Kalman filter.

In some embodiments, with the estimation state vector of Equation 10 remaining the same, Equations 22 and 23 can be used to extend the measurement vector of Equation 12 and the Jacobian matrix Hx of Equation 13 with additional measurements without affecting the estimation recursion scheme associated with Equations 14-17. In other words, in such embodiments, the estimation recursion scheme simply utilizes a longer measurement vector and larger Jacobian matrix Hx. Because the estimated vortex position 212 remains the only output, the inclusion of additional measurements or inputs, which provide additional information, into the measurement vector of Equation 12 and the Jacobian matrix Hx of Equation 13 improves the accuracy of the estimated vortex position 212 and the position of the trailing aircraft 20 relative to the vortex 30.

In another embodiment, the above-described vortex position determination scheme is supplemented with an additional model implemented by the vortex position module 210 that utilizes additional actual measurements to estimate the expected impact of the vortex on the measurements of Equation 12, and refines the estimated position of the trailing aircraft 20 relative to the vortex 30 based on the estimated expected impact. Generally, the model is configured to compare the estimated position of the trailing aircraft 20 relative to the vortex 30 obtained using the state vector of Equation 10 with the additional actual measurements of the relative position of the trailing aircraft with respect to the vortex, and correct the state vector based on the comparison. In one implementation, the actual measurements include the aerodynamic angles of attack and sideslip based on the output from several angle of attack vanes secured to the trailing aircraft 20 at various locations. The vortex position module 210 utilizes the output from six angle of attack vanes positioned near the nose of the trailing aircraft 20. In another implementation, the vortex position module 210 utilizes the output from four angle of attack vanes positioned at the tips of the wings and tail, respectively. The measured output from each vane can be modeled as $$\alpha_{meas,i} = T_i(\alpha_{nom,i} + \delta\alpha_{wake,i}) \quad (24)$$

$$\alpha_{nom,i} = \alpha_{nom,i}(U_{free}, V_{free}, W_{free}) \quad (25)$$

$$\delta\alpha_{wake,i} = f(U_{free}, V_{free}, W_{free}, U_{wake}, V_{wake}, W_{wake}) \quad (26)$$
$$= f(U_{free}, V_{free}, W_{free}, \hat{p}_{rel,c}, \hat{p}_{rel,v}, pos_{x,i}, pos_{y,i}, pos_{z,i}, \phi, \theta, \psi)$$

where $\alpha_{nom,i}$ is the nominal (out-of-wake) value for vane i, $\delta\alpha_{wake,i}$ is a wake-induced increment calculated based on the estimated position of the vane with respect to the wake and an analytic vortex model, $T_i$ is a tabulated vane-specific mapping that accounts for fuselage and Mach number effects, $pos_{x,i}$, $pos_{y,i}$, and $pos_{z,i}$ are the positions of each vane i on the trailing aircraft, $\phi$, $\theta$, $\psi$ are the components of the attitude of the trailing aircraft, and $p_{rel,c}$, $p_{rel,v}$ are the current estimates of the position of the trailing aircraft 20 with respect to the wake.

Sensor or measurement biases can be incorporated into the Kalman filter by being included as an additional state in the estimator state vector $\hat{x}$ of Equation 10, effectively extending the estimator state vector.

The aircraft control module 120 includes a lateral control module 230 configured to determine a crosstrack demand 232 and a vertical control module 240 configured to determine an altitude demand 242. The crosstrack demand 232 is associated with a lateral (e.g., horizontal) position component of the desired aircraft position 222 relative to the vortex 30 and the altitude demand 242 is associated with a vertical position component of the desired aircraft position value relative to the vortex. Once the crosstrack demand 232 is determined, the command module 140 generates a command (e.g., one or more of a roll command, rudder command, and sideslip command) for achieving the crosstrack demand. The trailing aircraft 20 may roll according to the roll command (or adjust rudder position and/or sideslip control elements according to the rudder and sideslip commands, respectively, as the case may be) such that the desired aircraft position 222 may be achieved. Similarly, once the altitude demand 242 is determined, the command module 140 generates an altitude command or achieving the altitude demand. The trailing aircraft 20 may then adjust its vertical position according to the altitude command such that the desired aircraft position 222 may be achieved.

The lateral control module 230 determines the crosstrack demand 232 based on the lateral component of the desired aircraft position 222. Basically, the crosstrack demand 232 can be associated with a desired change in roll (or rudder position and/or sideslip) to effectuate a change in the lateral position of the trailing aircraft 20 to achieve the lateral component associated with the desired aircraft position 222. Conventional formation flight control systems are configured to position the trailing aircraft away from a vortex, and as such, do not account for the aerodynamic effects of the vortex on the position of the trailing aircraft. Relying solely on such conventional approaches for determining the crosstrack demand 232 likely may lead to inaccurate and inefficient results. These shortcomings by robustly accounting for the effects of the vortex 30 on the position of the trailing aircraft 20.

Figure 6:
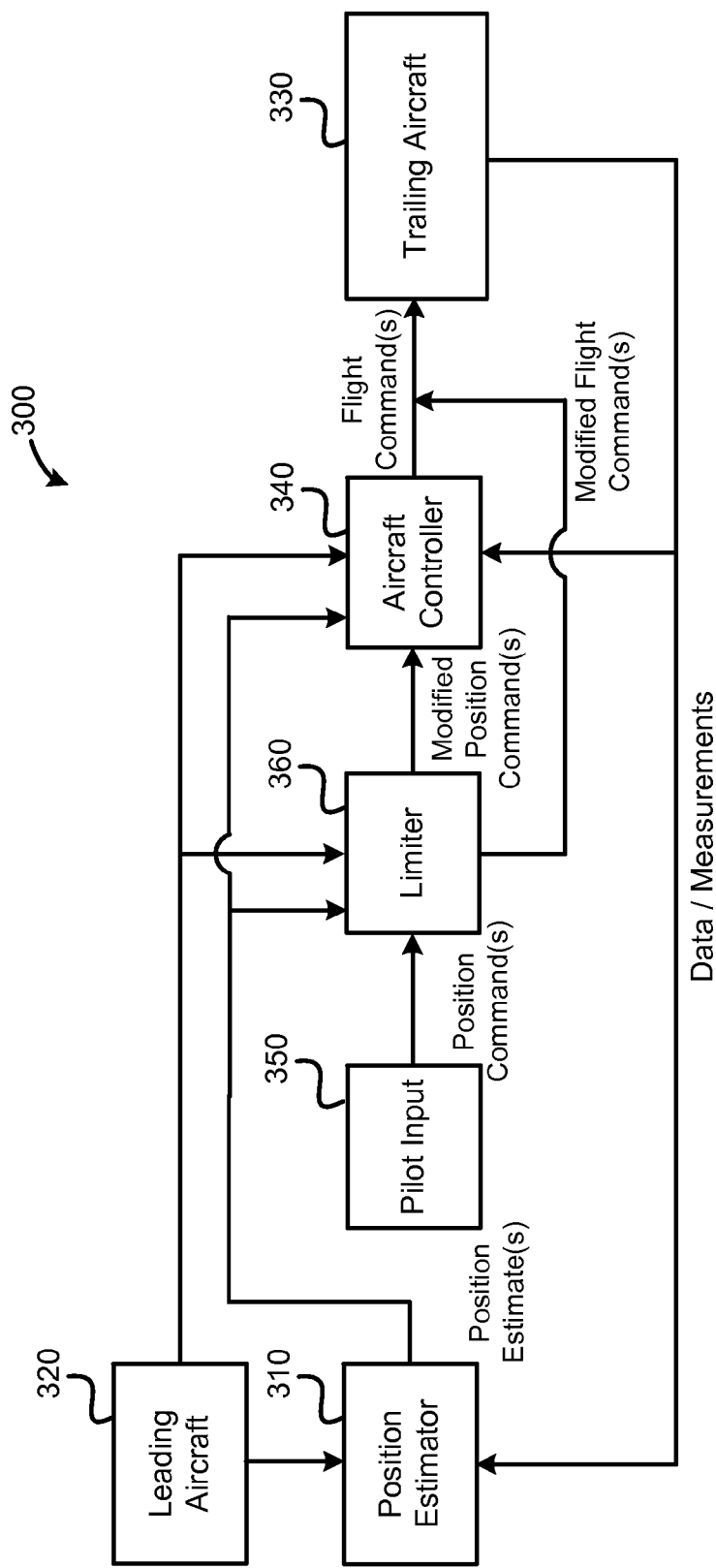
FIG. 6 is a schematic block diagram of a flight control system according to one embodiment utilizing pilot input.

The lateral control module 230 accounts for the possibility of unstable tracking dynamics by including the feedback interconnection between aircraft control module 120 or aircraft controller 340 and the innerloop autopilot of the trailing aircraft 330 (e.g., see FIG. 6). The trailing aircraft dynamic system can be represented generically by the following linear model $$\dot{x}_a = A_a x_a + \underbrace{[B_{1,a} \quad B_{2,a}]}_{B_a} \begin{bmatrix} \delta_a \\ \delta_r \end{bmatrix} \quad (27)$$

$$\begin{bmatrix} y_a \\ \dot{y}_a \\ \phi_a \\ p_a \end{bmatrix} = \begin{bmatrix} C_{1,a} \\ C_{2,a} \\ C_{3,a} \\ C_{4,a} \end{bmatrix} x_a. \quad (28)$$

The innerloop autopilot controller of the trailing aircraft 330 can be represented generically by the following $$\dot{x}_c = A_c x_c + \underbrace{[B_{1,c} \quad B_{2,c} \quad B_{3,c}]}_{B_c} \begin{bmatrix} \phi_c \\ \phi_a \\ p_a \end{bmatrix} \quad (29)$$

$$\begin{bmatrix} \delta_a \\ \delta_r \end{bmatrix} = \underbrace{\begin{bmatrix} C_{1,c} \\ C_{1,c} \end{bmatrix}}_{C_c} X_c + [D_{1,c} \quad D_{2,c} \quad D_{3,c}] \begin{bmatrix} \phi_c \\ \phi_a \\ p_a \end{bmatrix}. \quad (30)$$

Accordingly, based on Equations 27-30, the feedback interconnection between the aircraft control module 120 (e.g., aircraft controller 340) and the innerloop autopilot controller of the trailing aircraft 330 yields the updated closed loop dynamics models $$\underbrace{\begin{bmatrix} \dot{x}_a \\ \dot{x}_c \end{bmatrix}}_{x_p} = \begin{bmatrix} A_a + B_a [D_{2,c} \quad D_{3,c}] \begin{bmatrix} C_{3,a} \\ C_{4,a} \end{bmatrix} & B_a C_a \\ [B_{2,c} \quad B_{3,c}] \begin{bmatrix} C_{3,a} \\ C_{4,a} \end{bmatrix} & A_c \end{bmatrix} \underbrace{\begin{bmatrix} x_a \\ x_c \end{bmatrix}}_{x_p} + \quad (31)$$

$$\underbrace{\begin{bmatrix} B_a D_{1,c} \\ B_{1,c} \end{bmatrix}}_{B_p} \phi_c$$

$$\begin{bmatrix} y_a \\ \dot{y}_a \\ \phi_a \\ p_a \end{bmatrix} = \underbrace{\begin{bmatrix} C_{1,a} & 0 \\ C_{2,a} & 0 \\ C_{3,a} & 0 \\ C_{4,a} & 0 \end{bmatrix}}_{C_p} \begin{bmatrix} x_a \\ x_c \end{bmatrix} \quad (32)$$

which can be further reduced based on the assumption that the closed loop dynamics of the trailing aircraft 20 are stable in the absence of formation flight effects.

Based on simple models of formation flight effects (e.g., roll moment and lateral force) as a function of crosstrack position and as discussed above, Equations 31 and 32 yield $$x_\omega = \begin{bmatrix} \dot{x}_p \\ \dot{x}_d \end{bmatrix} \quad (33)$$

$$= \begin{bmatrix} A_p + C_{acc}^\dagger D_d C_{1,a} + B_p K_\phi C_{3,a} & C_{acc}^\dagger M C_d \\ 0 & A_d \end{bmatrix} x_\omega + \begin{bmatrix} B_p \\ 0 \end{bmatrix} v$$

-continued $$y_\omega = \begin{bmatrix} y_a \\ \dot{y}_a \\ \phi_a \\ p_a \end{bmatrix} \quad (34)$$
$$= C_p x_p$$

Equations 33 and 34 can be even more refined by incorporating a relationship between the crosstrack error $e_{xtrk}$ and the difference between $y_{cmd}$ and $y_a$.

Based on Equations 33 and 34, the crosstrack demand 232 is determined from the following dynamic controller $$\dot{x}_{OL} = [0]x_{OL} + [-1 \quad 1 \quad 0 \quad 0] \begin{bmatrix} y_{cmd} \\ y \\ \dot{y} \\ \phi \end{bmatrix} \quad (35)$$

$$\phi_c = \underbrace{K_{e_{int}}x_{OL}}_{C_{OL}} + \underbrace{[K_{y_{cmd}} \quad K_y \quad K_{\dot{y}} \quad K_\phi]}_{D_{OL}} \begin{bmatrix} y_{cmd} \\ y \\ \dot{y} \\ \phi \end{bmatrix} \quad (36)$$

where Equation 35 provides integral control, $\dot{y}$ is a crosstrack rate feedback value, and $\phi$ is a roll feedback value, which can be replaced or supplemented with a rudder position feedback value and/or sideslip feedback value depending on whether the crosstrack command is associated with a rudder and/or sideslip command instead of or in addition to a roll command. The control law employed by the lateral control module 230 and aircraft controller 340 to determine the crosstrack demand 232 is based on Equations 35 and 36, which have a proportional-integral-derivative architecture. The feedback of the estimated crosstrack rate is utilized in Equations 35 and 36, which can eliminate yaw error. Eliminating yaw error from Equations 35 and 36 eliminates inaccuracies associated with assuming zero-sideslip turn coordination in the presence of formation flight effects. Additionally, integral tracking error feedback is used which facilitates accurate and robust tracking of the position of the trailing aircraft 20 in the presence of formation flight effects.

The vertical control module 240 determines the altitude demand 242 based on the vertical (e.g., altitude) component of the desired aircraft position 222, which is based on the vertical component of the vortex position vector of Equation 5. Basically, the altitude demand 242 is associated with a desired change in altitude (e.g., vertical offset) for positioning the trailing aircraft 20 at the altitude associated with the desired aircraft position 222. In addition to the vertical component of the vortex position vector of Equation 5, in some implementations, the vertical offset is determined based on several conditions determined by the leading aircraft 10 and transmitted to the trailing aircraft 20, such as the strength of the wake and the inertial wind estimates or wind conditions, and several conditions determined by the trailing aircraft, such as the altitude and altitude rate of change of the trailing aircraft.

Figure 5:
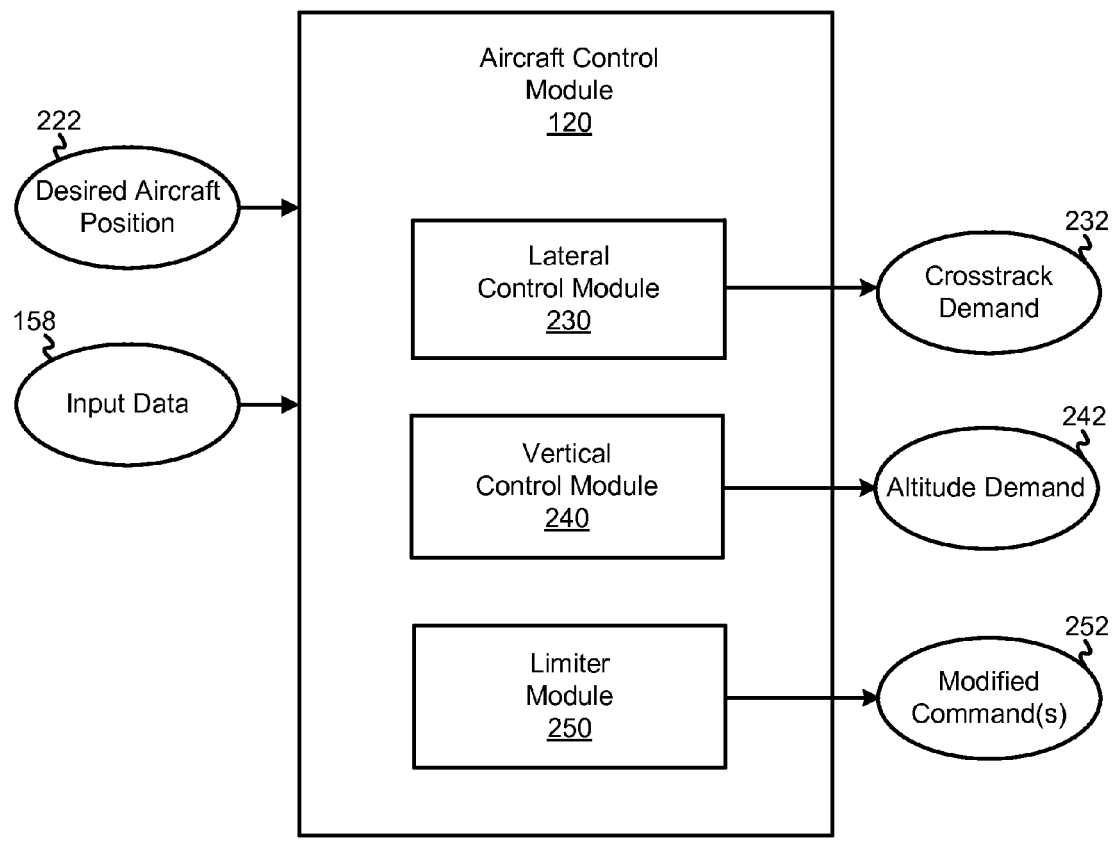
FIG. 5 is a schematic block diagram of an aircraft control module of the flight controller configured to determine a roll demand and altitude demand according to one embodiment.

Referring to FIG. 5, the aircraft control module 120 also includes a limiter module 250 configured to generate modified command(s) 252 based on the input data 158. The modified command(s) 252 includes one or more of a modified position command (e.g., modifying the desired position data from the aircraft position module 110 or peak-seeking module 130) and a modified flight command (e.g., modifying the flight commands 150 from the command module 140). Despite the improvements in the crosstrack and vertical position tracking and control provided by the position module 110, lateral control module 230, and vertical control module 240, various disturbances (e.g., wind variation (gusts) and leader aircraft motion) may negatively affect the position of the trailing aircraft 20 relative to the vortex 30. For example, such disturbances may cause unintended crossings into and/or through the vortex 30 when the trajectory of the trailing aircraft 20 encounters regions where the controller defined by Equations 35 and 36 breaks down or is unable to compensate for such disturbances.

Accordingly, in general terms, the limiter module 250 is configured to modify the controller defined by Equations 35 and 36 in order to provide protection against disturbance-induced vortex crossings. Essentially, the limiter module 250 is operable to limit the extent of the excursion of the trailing aircraft 20 from a predefined point. The limiter module 250 limits the physical excursion of the trailing aircraft 20 from a predefined point, to prevent disturbance-induced vortex crossings by modifying the vortex position 212 determined by the vortex position module 210 and/or adding an additional flight command (e.g., roll, rudder, and/or sideslip command) to or modifying the trailing aircraft flight command 150. Further, in some implementations, the limiter module 250 includes augmented logic that limits or modifies a turn command of the trailing aircraft 20 to temporarily restrict certain movements of the trailing aircraft toward the vortex 30 (e.g., to prevent disturbance-induced vortex crossings) during a turning operation.

The limiter module 250 includes an algorithm-implementing controller that operates to limit the physical excursion of the trailing aircraft 20 when necessary to prevent unintended vortex crossings. The algorithm implemented by the controller of the limiter module 250 is based on the following modified control signal $u_p$ and modified tracking command $y_{cmd}$ $$u_p = u_{trk} + k_u \gamma(x_p) u_{sl} \quad (37)$$

$$y_{cmd} = (r - \eta_{trk})(1 - \gamma(x_p)) + \gamma(x_p)u_{sl} + \eta_{trk} \quad (38)$$

where $u_{trk}$ is the original or unmodified crosstrack command signal, $k_u$ is a scalar gain, $\eta_{trk}$ is a crosstrack output reference point of a specified compact region from which the original crosstrack command signal $u_{trk}$ is prevented from leaving, and $\gamma(x_p)$ is a modulation function defined as $$\gamma(x_p) = \max\left(0, \min\left(1, 1 + \frac{\max\left(\frac{x_p - \eta}{x_{max}}\right) - 1}{\delta_{SL}}\right)\right) \quad (39)$$

where the "hard limit" or "hard threshold" of an allowable range of the state to be limited $x_p$ is parameterized by a magnitude $x_{max}$ and a bias $\eta$, $\delta_{SL}$ is a percentage of the allowable range to be used as a transition region, which defines a "soft limit" or "soft threshold" of the allowable range.

According to some embodiments, the modified tracking command $y_{cmd}$ defined by Equation 38 can be filtered by a low-pass filter with one-side rate-saturation before being used to generate the modified command(s) 252. By tuning the low-pass filter, overshoot characteristics of a closed loop system implemented by the modules of the controller 100 can be modified. Rate saturation of the filtered signal limits the command rate toward the vortex 30, while not limiting the command rate away from the vortex.

According to yet some embodiments, the modulation function $\gamma(x_p)$ can be modified so that the limiting action of the limiter module 250 is performed only as the trailing aircraft 20 approaches the vortex 30. In other words, in such embodiments with one-side limiting, the limiter module 250 does not execute the limiting algorithm if the trailing aircraft 20 is moving away from the vortex 30.

In some embodiments, the modulation function $\gamma(x_p)$ can be filtered by passing the calculated value from Equation 39 through a one-sided low-pass filter (e.g., according to the relationship $\gamma_{k+1}=\max(\gamma_{BL},(1-T_s\tau)\gamma_k)$). Such one-sided filtering of the modulation function applies the limiting action of the limiter module 250 as soon as any of the soft limits are met, but delays the return of the modified tracking command $y_{cmd}$ to its nominal or unmodified value. Generally, in the case of limiting a crosstrack command, when the crosstrack command demands movement of the trailing aircraft 20 into a position of instability with respect to the vortex 30, and the limiting action of the limiter module 250 modifies the crosstrack command to move away from the vortex, the slow decay of the modulation function via the one-sided low-pass filter restricts the crosstrack command from quickly returning to the region of instability. In this manner, such one-sided low-pass filtration of the modulation function can increase the time that the trailing aircraft 20 is positioned in regions of stability, which leads to more stable closed-loop control.

According to one embodiment, the state or command $x_p$ monitored for limiting is the crosstrack position command $y_{trk}$, which can be represented as a function of the crosstrack position r as follows $$\lim_{t\to\infty} y_{trk} = r \qquad (40)$$

where it is assumed that asymptotic tracking for constant values for the crosstrack position r is achievable (e.g., the control system implemented by the controller 100 is stable). Further, based on the above assumption, a nominal closed loop dynamics can be $$\underbrace{\begin{bmatrix}\dot{x}_p\\ \dot{x}_c\end{bmatrix}}_{\dot{x}} = \underbrace{\begin{bmatrix}A_p+B_pD_{c,2}C_p & B_pC_c\\ B_{c,2}C_p & A_c\end{bmatrix}}_{A}x + \underbrace{\begin{bmatrix}B_pD_{c,1}\\ B_{c,1}\end{bmatrix}}_{B}[y_{cmd}] + \underbrace{\begin{bmatrix}B_p\\ 0\end{bmatrix}}_{B_2}k_u\gamma(x_p)u_{sl} \qquad (41)$$

$$\dot{x} = Ax + By_{cmd} \qquad (42)$$

where the dynamics matrix A is Hurwitz, such that positive definitive matrices P and Q satisfy the following $$PA+A^TP=-Q \qquad (43).$$

For a non-zero scalar gain $k_u$, an input-to-state stability (ISS) Lyapunov function can be defined as $$V(x)=x^TPx \qquad (44)$$

such that a corresponding time rate of change of the ISS-Lyapunov function $\dot{V}$ can be represented as $$\dot{V} = \dot{x}^TPx + x^TP\dot{x} \qquad (45)$$

$$= u_{sl}^T\gamma(x_p)k_uB_2^TPx + y_{cmd}^TB^TPx +$$

-continued $$x^TA^TPx + x^TPAx + x^TPBy_{cmd} + x^TPB_2k_uu_{sl} \qquad (46)$$

$$= -x^TQx + 2x^TPB((r-\eta_{trk})(1-\gamma(x_p))+\eta_{trk}) + \qquad (47)$$

$$2x^TP\gamma(x_p)\underbrace{(B+B_2k_u)}_{B_{sl}}u_{sl}.$$

By setting the control signal $u_{sl}$ equal to $-KB^1Px$, Equation 47 becomes $$\dot{V}=-x^TQx-2\gamma(x_p)x^TPB_{sl}KB_{nl}^TPx+2x^TPB((r-\eta_{trk})(1-\gamma(x_p))+\eta_{trk}) \qquad (48)$$

$$\leq -x^TQx+2x^TPB((r-\eta_{trk})(1-\gamma(x_p))+\eta_{trk}) \qquad (49).$$

The limiter module 250 executes the function dynamics defined by Equations 48 and 49 to provide the modified command(s) 252.

As defined in Equations 48 and 49, the modified command(s) 252 are limited according to the state or command $x_p$ selected for limitation. As discussed above, in one implementation, the state $x_p$ selected for limitation is the crosstrack position $y_{trk}$. Generally, the limiter algorithm incorporated into the function dynamics prevents the crosstrack position from getting too close to the vortex core (e.g., a region of instability), which might result in an uncommand vortex crossing. Additionally, in some implementations, the state $x_p$ selected for limitation is the crosstrack rate $\dot{y}_{trk}$ (e.g., the velocity of the trailing aircraft in the crosstrack direction). Limiting the crosstrack rate $\dot{y}_{trk}$ can prevent the crosstrack position from rapidly moving through the soft and hard limits of the modulation function. As the trailing aircraft 20 nears a vortex core, the crosstrack rate typically incurs oscillations of increasing magnitude. By limiting the crosstrack rate, the crosstrack position command $y_{cmd}$ can be modified to move the trailing aircraft 20 away from the region of instability. Further, the limits applied to the crosstrack rate can be set as a function of the crosstrack position, such that as the trailing aircraft 20 is positioned closer to the vortex core, the allowed crosstrack rate (e.g., maximum crosstrack rate) is reduced.

According to some embodiments, when limiting the crosstrack position, the limiter module 250 produces modified command(s) 252 that are equal to the trailing aircraft flight command(s) 150 until the crosstrack position exceeds the predetermined soft limit. Once the crosstrack position exceeds the predetermined soft limit, the modulation function $\gamma(x_p)$ begins to affect the modified command(s) 252 such that the modified command(s) are different than the aircraft flight command to effectively "push" the trailing aircraft 20 away from the vortex 30 to satisfy the soft limit.

Referring to FIG. 6, a control system 300 configured to execute the functionality of the position and aircraft control modules 110, 120 is shown schematically. The control system 300 includes a position estimator 310, an aircraft controller 340, and a limiter 360. The position estimator 310 may include the position module 110, the aircraft controller 340 may include the aircraft control module 120, and the limiter 360 may include the limiter module 250. Based on assumed or determined operating parameters of the leading and trailing aircrafts 320, 330, the position estimator 310 determines an estimated position of the vortex and an estimated position of the trailing aircraft relative to the vortex. The position estimates are received by the aircraft controller 340, which generates flight command(s), which can include a roll command and/or altitude command, for the trailing aircraft 330 based at least partially on the position estimates. The aircraft controller 340 may also utilize position commands received from pilot input 350, feedback from the leading aircraft 320, and feedback from the trailing aircraft 330 in its determination of the flight command(s).

The limiter 360 receives data from the leading aircraft 320, the position estimate(s) from the position estimator 310, and the position command(s) from the pilot input 350, and either modifies, or replaces, the position command(s) with modified position command(s) or modifies, or replaces, the flight command(s) with modified flight command(s), to prevent inadvertent vortex crossings. Accordingly, the modified position command(s) and modified flight command(s) generated by the limiter 360 can be either adjustments to or replacements of the position command(s) generated by the pilot input 350 and the flight command(s) generated by the aircraft controller 340, respectively.

The aircraft controller 100 may also include a peak-seeking module 130 in some embodiments. Generally, the peak-seeking module 130 provides peak-seeking control for efficiently moving the trailing aircraft to an optimal flight state (e.g., the desired aircraft position 222) that minimizes induced drag. The peak-seeking control of the peak-seeking module 130 is based on the use of an extended Kalman filter to estimate various parameters associated with a measured performance metric function. The peak-seeking control is based on the following definitions and deductions. A distance vector $\delta_{vp}$ can be defined as the difference between the position vector of the vortex 30 (e.g., $x_v$) and the position vector of the trailing aircraft 20 (e.g., $x_p$) (see, e.g., FIGS. 2A and 2B). Correspondingly, assuming the behavior of the performance metric can be locally modeled, in some embodiments, a mapping function of a performance metric $f_m(\delta_{vp})$, with the performance metric being a function of the position of the trailing aircraft 20 relative to the vortex 30, can be represented generally by $$f_{m,0}(\delta_{vp}) = \delta_{vp}^T Q_2 \delta_{vp} + Q_1 \delta_{vp} + Q_0 \tag{50}$$

where $Q_0$, $Q_1$, and $Q_2$ are unknown matrices of appropriate dimensions. The performance metric can be any of various metrics, such as trim pitch angle, aileron deflection, throttle command, and the like. Equation 50 can be utilized to determine $\delta^*_{vp}$ which is the optimal distance vector defined as the difference between the position vector of the vortex 30 (e.g., $x_v$) and the desired position vector of the trailing aircraft 20 (e.g., $x_{opt}$) (see, e.g., FIGS. 2A and 2B), and can be represented as follows $$\delta^*_{vp} = -\tfrac{1}{2} Q_2^{-1} Q_1^T \tag{51}$$

A position error $e_{vp}$ can be defined as the difference between $\delta_{vp}$ and $\delta^*_{vp}$ (see, e.g., FIG. 1). Further, the performance metric of Equation 50 can be expressed as a function of $e_{vp}$, as follows $$f_m(e_{vp}) = \left(e_{vp} - \tfrac{1}{2}Q_2^{-1}Q_1^T\right)^T Q_2 \left(e_{vp} - \tfrac{1}{2}Q_2^{-1}Q_1^T\right) + Q_1\left(e_{vp} - \tfrac{1}{2}Q_2^{-1}Q_1^T\right) + Q_0 + q(e_{vp} + \delta^*_{vp}) \tag{52}$$

which can be reduced to the modified metric function $$e_{vp}^T M_2 e_{vp} + M_0 + m(e_{vp}) \tag{53}$$

where $M_2$ is equal to $Q_2$ and the linear term $m(e_{vp})$ is reduced to zero in the coordinates of the new inertial coordinate system.

Considering the position of the trailing aircraft 20 relative to the vortex 30 and the desired aircraft position 222 as estimated quantities with associated errors, the estimated position of the aircraft relative to the vortex $\hat{\delta}_{vp}$ and the estimated desired aircraft position 222 (e.g., $\hat{\delta}^*_{vp}$) are equal to $$\hat{\delta}_{vp} = \delta_{vp} + \tilde{\delta}_{vp} \tag{54}$$

$$\hat{\delta}^*_{vp} = \delta^*_{vp} + \tilde{\delta}^*_{vp} \tag{55}$$

where $\tilde{\delta}_{vp}$ is the relative position error. The estimated optimal position discrepancy $$\hat{e}_{vp} = \hat{\delta}_{vp} - \hat{\delta}^*_{vp} \tag{56}$$

can be reduced to $$e_{vp} + \tilde{e}_{vp} \tag{57}$$

by utilizing Equations 54 and 55, as well as the definition of the position error $e_{vp}$ as defined above, where $\tilde{e}_{vp}$ is the optimal position error. The modified metric function represented by Equation 53 can then be expressed in terms of the estimated optimal position discrepancy $\hat{e}_{vp}$ and the optimal position error $\tilde{e}_{vp}$ as $$\hat{e}_{vp}^T M_2 \hat{e}_{vp} - 2\hat{e}_{vp}^T M_2 \tilde{e}_{vp} + \tilde{e}_{vp}^T M_2 \tilde{e}_{vp} + M_0 + m(\hat{e}_{vp} - \tilde{e}_{vp}) \tag{58}$$

The control system governing operation of the trailing aircraft 20 is controlled by the peak-seeking module 130 to achieve the desired peak-seeking control of the aircraft into the desired aircraft position 222. The control system dynamics of the peak-seeking module 130 outputs a position command or commands, and the controller 100 issues flight command(s) to move the trailing aircraft 20 to the position command(s) output such that estimated optimal position discrepancy $\hat{e}_{vp}$ is reduced to zero.

The position error $e_{vp}$ is reduced by virtue of an estimation algorithm executed by the peak-seeking module 130. The estimation algorithm is based on the modified metric function represented by Equation 53 above as further re-parameterized by setting $M_2$ from Equations 53 and 58 as follows $$M_2 = N^T N \tag{59}$$

$$N = \begin{bmatrix} n_{11} & n_{12} \\ 0 & n_{22} \end{bmatrix} \tag{60}$$

Based on Equations 59 and 60, an estimation state vector $\hat{x}$ can be populated with the unknown quantities can be defined as follows $$\hat{x} = \begin{bmatrix} \hat{n}_{11} & \hat{n}_{12} & \hat{n}_{22} & \hat{M}_0 & \hat{e}_{vp}(1) & \hat{e}_{vp}(2) \end{bmatrix}^T \tag{61}$$

$$\equiv \begin{bmatrix} \hat{x}_1 & \hat{x}_2 & \hat{x}_3 & \hat{x}_4 & \hat{x}_5 & \hat{x}_6 \end{bmatrix}^T \tag{62}$$

In certain implementations, the estimation state vector $\hat{x}$ is assumed to be constant when determining the dynamic state estimator of the peak-seeking module 130 as will be described in more detail below. Another vector $\hat{y}$ containing assumed known or measured quantities can be defined as follows $$y = \begin{bmatrix} \hat{e}_{vp}(1) & \hat{e}_{vp}(2) \end{bmatrix}^T \tag{63}$$

$$\equiv \begin{bmatrix} y_1 & y_2 \end{bmatrix}^T. \tag{64}$$

Based on Equations 61 and 63, a Jacobian matrix H(x,y) of the metric function represented by Equation 53 with respect to the state vectors $\hat{x}$ and $\hat{y}$ can be computed as follows $$H(x, y) = \frac{\partial f_m}{\partial x} \quad (65)$$

$$= \begin{bmatrix} 2(x_5 - y_1)(n_{11}(x_5 - y_1) + n_{12}(x_6 - y_2)) \\ 2(x_6 - y_2)(n_{11}(x_5 - y_1) + n_{12}(x_6 - y_2)) \\ 2n_{22}(x_6 - y_2)^2 \\ 1 \\ 2n_{11}(n_{11}(x_5 - y_1) + n_{12}(x_6 - y_2)) - \frac{\partial m}{\partial x_5} \\ 2(n_{12}^2(x_6 - y_2) + n_{22}^2(x_6 - y_2) + \\ n_{11}n_{12}x_5 - n_{11}n_{12}y_1) - \frac{\partial m}{\partial x_6} \end{bmatrix}^T.$$

According to Equation 65, the dynamic state estimator of the peak-seeking module 130 for providing peak-seeking control may be constructed as follows $$\dot{\hat{x}} = K(f_m - \hat{f}_m(x, y)) \quad (66)$$

$$\hat{f}_m(x, y) = f_{m,0}(x, y) \quad (67)$$

$$K = PH_0^T(H_0 P H_0^T + R)^{-1} \quad (68)$$

$$H_0 = \frac{\partial f_{m,0}}{\partial x}. \quad (69)$$

From Equations 66-69, two final state estimates ($\hat{\tilde{e}}_{vp} = [\hat{\tilde{e}}_{vp}(1), \hat{\tilde{e}}_{vp}(2)]^T$) can be extracted, which allows the auxiliary control signal v to be defined as $v = -\hat{\tilde{e}}_{vp}$, which yields the following relationship $$e_{vp} \to -\tilde{e}_{vp} + \hat{\tilde{e}}_{vp} \quad (70).$$

Based on Equation 70, better peak-seeking performance (e.g., a lower value of $f_m$) likely is achieved when the actual position error $e_{vp}$ is smaller than $\tilde{e}_{vp}$.

The peak-seeking module 130 implements the dynamic state estimator of Equations 66-69 in discrete-time. The discrete-time approach facilitates the reformulation of a dither signal, which is typically required for peak-seeking schemes, to a sequence of low-frequency square wave pulses. Such a reformulation to the dither signal allows the trailing aircraft 20 to come to a trim state prior to sampling the metric function, which obviates the need to account for dynamics and transients, and significantly reduces the number of changes in the dither signal. Essentially, the peak-seeking module 130 modifies crosstrack and altitude commands based on the current estimate of the optimal location (e.g., desired aircraft position 222) as determined by the desired aircraft position module 220 in combination with a search pattern that is proportional to the uncertainty of the estimate. The search pattern can be any of various types, sizes, and configurations of search patterns. In some implementations, the search pattern includes a plurality of data points (e.g., nine data points in one implementation) about a region.

For each data point, the performance metric, which can be an element of an estimator state vector (e.g., Equation 10), is evaluated using the dynamic state estimator described above for a different variable value (e.g., actual position error $e_{vp}$) to obtain a data set that provides a more accurate estimation of the performance metric and a more accurate desired aircraft position 222. For example, the function represented in Equation 53 is run for a chosen performance metric at each data point of the search pattern, and a Kalman filter technique is used to filter the calculated value of Equation 53, to estimate the shape of a quadratic model patterned about a region defined by the search pattern. The estimated shape of the quadratic model is essentially "bowl-like" such that it has a minimum value at a bottom of the bowl. The size or region of the search pattern is selected such that at least some data points of the search pattern are position about the quadratic model to help define the shape of the quadratic model, and ensure that the bottom of the "bowl" of the quadratic model is within the region defined by the search pattern. After a first iteration of defining the shape of the quadratic model using the search pattern with a first region, the bottom of the "bowl" of the quadratic model of Equation 53 is determined. The estimator state vector is updated with the value of the performance metric associated with the bottom of the bowl, and the new desired aircraft position is determined based on the updated estimator state vector. Then a second iteration of defining the shape of the quadratic model is performed using the same (or a different) search pattern, but with a smaller second region, positioned locally about the bottom of the bowl. Because the second region is smaller and positioned about the bottom of the first "bowl," the second "bowl" is a smaller, and more precise and accurate representation of the quadratic model. Accordingly, the bottom of the second "bowl" provides a more accurate and refined value for the estimator state vector.

The above iterative process is repeated to continuously update the shape of the quadratic model, and derive more accurate and refined values for the estimator state vector from the updated shapes. Because this peak-seeking methodology estimates the optimum value for the estimator state vector for each iteration, as opposed to iteratively moving along the edge of the same "bowl" in a selected direction until an optimum value is found as with the prior art, the optimum value is estimated quicker than with prior art peak-seeking methodologies, which leads to more responsive peak-seeking control. To further improve accuracy and responsiveness, multiple search patterns and/or multi-dimensional search patterns (e.g., 3-D search patterns, 4-D patterns, etc.) can be used for each iterative process.

Figure 7:
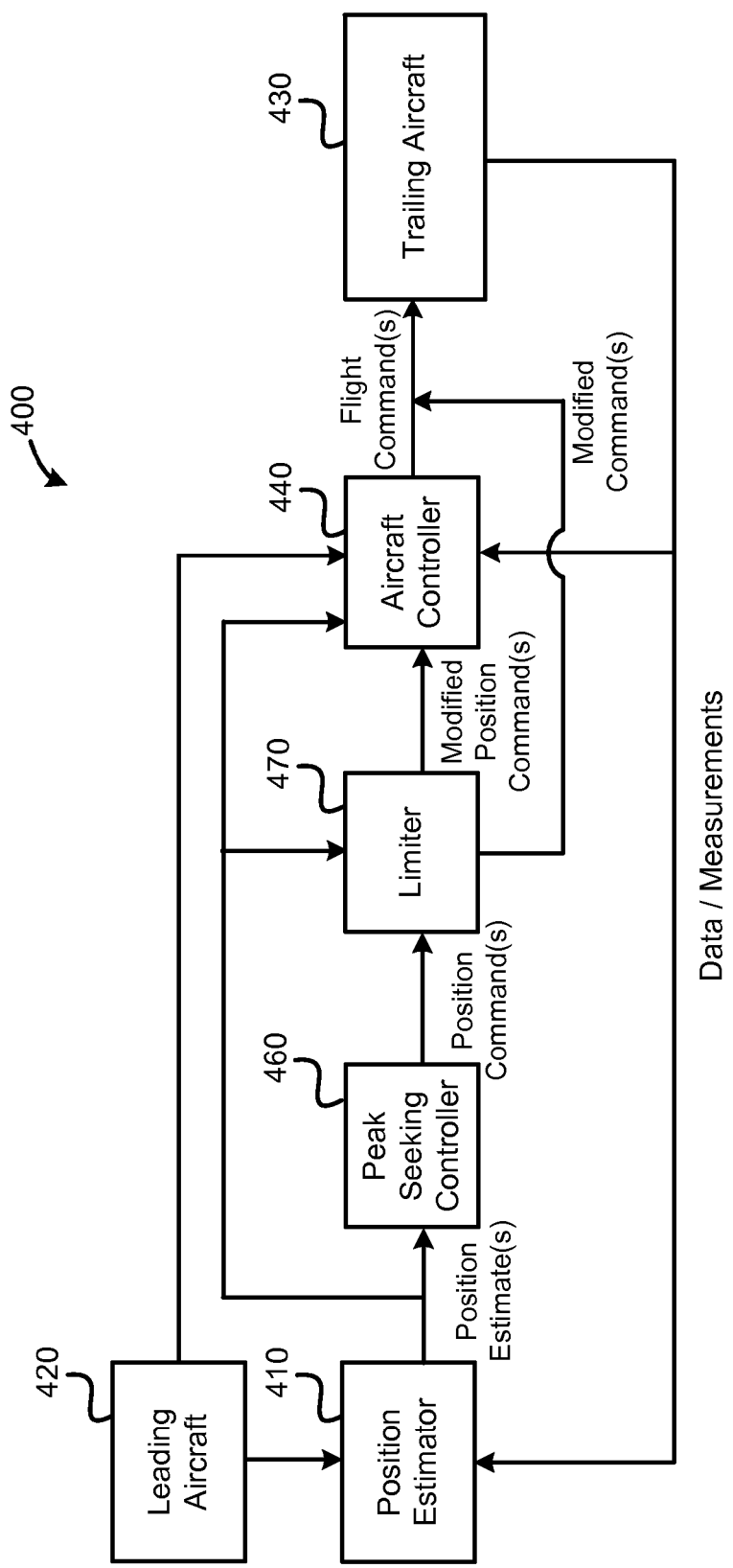
FIG. 7 is a schematic block diagram of a flight control system according to another embodiment with a peak-seeking controller.

Referring to FIG. 7, a control system 400 configured to execute the functionality of the peak-seeking module 130 is shown schematically. The control system 400 includes a position estimator 410 and an aircraft controller 440. The position estimator 410 may include the position module 110 and the aircraft controller 340 may include the aircraft control module 120. Similar to the position estimator 310, the position estimator 410 determines an estimated position of the vortex and an estimated position of the trailing aircraft relative to the vortex. The position estimates are received by the aircraft controller 440, which generates a roll command and/or altitude command for the trailing aircraft 430 based at least partially on the position estimates. The aircraft controller 440 may also utilize feedback from the leading aircraft 420 and feedback from the trailing aircraft 430 in its determination of the flight command(s).

Additionally, the control system 400 includes a peak-seeking controller 460 that includes the peak-seeking module 120. The peak-seeking controller 460 receives the position estimate(s) from the position estimator, and generates position command(s) (e.g., desired position of the trailing aircraft 20) based on the position estimate(s). The position command(s) are then received by the aircraft controller 440, which issues flight command(s) to the trailing aircraft 20 based at least partially on the position command(s). Basically, then, the peak-seeking controller 460 sets a desired aircraft position based on the parameters associated with the minimum performance metric value.

The control system 400 also includes a limiter 470 similar to the limiter 360 of the control system 300. The limiter 470 receives data from the leading aircraft 420, the position estimate(s) from the position estimator 410, and the position command(s) from the peak-seeking controller 460, and either modifies, or replaces, the position command(s) with modified position command(s) or modifies, or replaces, the flight command(s) with modified flight command(s), to prevent inadvertent vortex crossings. Accordingly, the modified position command(s) and modified flight command(s) generated by the limiter 470 can be either adjustments to or replacements of the position command(s) generated by the peak-seeking control 460 and the flight command(s) generated by the aircraft controller 440, respectively.

Figure 8:
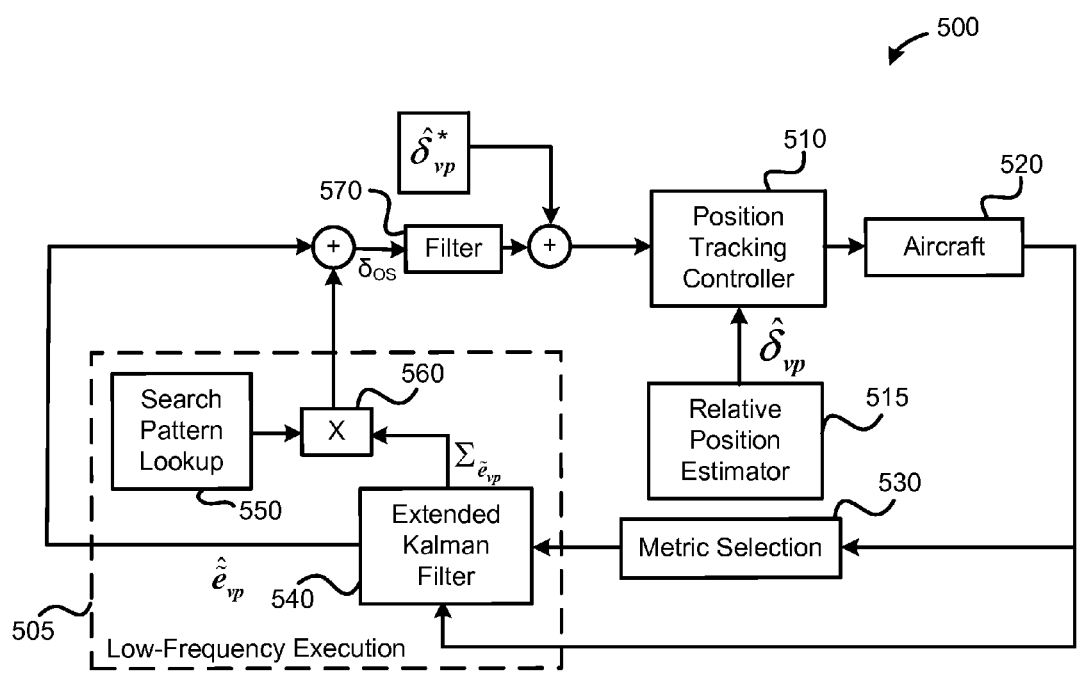
FIG. 8 is a schematic block diagram of a flight control system according to another embodiment detailing a peak-seeking module of the system.

According to one embodiment, the control system of a peak-seeking module 505 is shown schematically in FIG. 8 as part of a control system 500 for the trailing aircraft 20. Generally, the control system 500 includes a position tracking controller 510, which can form part of and be operable by the aircraft control module 120 of the controller 100. As discussed above, the position tracking controller 510 is configured to provide flight commands (e.g., roll and altitude commands) to the trailing aircraft 520 to achieve a desired aircraft position relative to a vortex in a desired manner. The position tracking controller 510 determines the roll and altitude commands based at least partially on the estimated position of the aircraft relative to the vortex $\hat{\delta}_{vp}$ as determined by a relative position estimator 515, which can form part of the vortex position module 210 of the controller 100. The position tracking controller 510 also determines the roll and altitude commands based at least partially on the estimated desired aircraft position $\hat{\delta}^*_{vp}$, which can be determined by the desired aircraft position module 220, received as input from a pilot of trailing aircraft 20, and/or received from the peak-seeking module 130. Generally, the peak-seeking module 505 is operable to generate the estimated desired aircraft position $\hat{\delta}^*_{vp}$ or modify the estimated desired aircraft position $\hat{\delta}^*_{vp}$ received from pilot input, based at least partially on sensed performance metrics associated with operation of the trailing aircraft, before being received by the position tracking controller 510 and used to determine the trailing aircraft flight commands 150 (e.g., roll and altitude commands).

The control system 500 includes a metric selection module 530 that selects the performance metric on which the peak-seeking module 505 determines the adjustment to the estimated desired aircraft position $\hat{\delta}^*_{vp}$. Essentially the peak-seeking module 505 is configured to eliminate or reduce the errors likely associated with the estimate of the desired aircraft position $\hat{\delta}^*_{vp}$ and the estimate of the position of the aircraft relative to the vortex $\hat{\delta}^*_{vp}$. In this manner, the peak-seeking control of the peak-seeking module 505 is not susceptible to the errors associated with modeling the estimated position of the aircraft relative to the vortex and the desired aircraft position. The control system 500 further includes an extended Kalman filter 540. For each element of the state vector, the filter 540 produces an estimate of the value of the element via an extended Kalman filter recursion scheme as discussed above, and an uncertainty factor $\Sigma_{\hat{e}_{vp}}$ representing a prediction of how close the estimate is to the actual value. Generally, as the extended Kalman filter 540 receives more useful information, the quality of the estimate increases, and the uncertainty factor decreases (i.e., confidence in the accuracy of the estimate increases). Further, the extended Kalman filter 540 also calculates the estimated optimal position error $\hat{\hat{e}}_{vp}$ associated with Equation 73 above.

The peak-seeking module 505 further includes a scaling block or module 560 that scales the size of the area or region of the search pattern selected from a search pattern lookup 550. A single 2-D (or higher-dimensional) search pattern, or multiple search patterns, may be selected from the search pattern lookup 550. The scaling block 560 scales the selected search pattern based on the uncertainty factor $\Sigma_{\hat{e}_{vp}}$. More specifically, in some implementations, the scaling block 560 scales the selected search pattern by the uncertainty factor $\Sigma_{\hat{e}_{vp}}$. Accordingly, as the uncertainty factor increases, the size of the area or region of the search pattern correspondingly increases and the trailing aircraft 20 spends less time near the optimal position relative to the vortex. In contrast, as the estimator becomes more confident in the estimate and the uncertainty factor decreases, the size of the search pattern decreases and the trailing aircraft 20 spends more time near the optimal location.

Based on the value of the bottom of the bowl obtained from application of the scaled search pattern, the peak-seeking module 505 calculates a refined estimated optimal position error. The control system 500 then sums the estimated optimal position error $\hat{\hat{e}}_{vp}$ with the refined estimated optimal position error to create a position offset value $\delta_{OS}$. The position offset value is filtered by a filter 570 to smooth out the position offset value $\delta_{OS}$ before being summed with the estimated desired aircraft position $\hat{\delta}^*_{vp}$. Accordingly, the peak-seeking module 130 is configured to determine a position offset value $\delta_{OS}$ that adjusts or modifies the estimated desired aircraft position $\hat{\delta}^*_{vp}$ based on "feeling" where the trailing aircraft 20 is relative to the vortex 30.

Although the peak-seeking control described above is associated with controlling the position of a trailing aircraft with respect to a vortex, it is recognized that the iterative process of the peak-seeking control for determining an optimal performance metric value can be applied to other applications where the performance metric is not a function of the position of the vortex. For example, the performance metric can be associated with the position of flap surfaces of a low-deflection flap system of an aircraft during automatic pilot cruise operation.

As will be appreciated by one skilled in the art, aspects of the present application may be embodied as a system, method, and/or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present application may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing.

In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

Aspects of the embodiments may be described above with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for controlling a formation flight of a trailing aircraft relative to a vortex generated by a leading aircraft, comprising
   a position module configured to determine a position of the vortex relative to the trailing aircraft based on an estimate of wind conditions and an estimator state vector comprising a velocity of the leading aircraft and a relative position between the vortex and the trailing aircraft, the estimate of wind conditions being based on at least one air data measurement obtained by the leading aircraft and the estimator state vector being based on a first set of measurements, wherein the position module updates the estimator state vector based on a comparison between at least one actual measurement obtained by the trailing aircraft and the position of the vortex relative to the trailing aircraft determined by the position module, the at least one actual measurement differing from the first set of measurements;
   a desired position module configured to determine a desired position of the trailing aircraft relative to the vortex for providing desired vortex-induced aerodynamic benefits based on the position of the vortex; and
   a control module configured to control flight of the trailing aircraft based on the desired position of the trailing aircraft.

2. The apparatus of claim 1, wherein the at least one air data measurement obtained by the leading aircraft comprises measurements taken from a plurality of angle of attack and sideslip vane sensors on the leading aircraft.

3. The apparatus of claim 1, wherein the estimate of wind conditions is based on at least one of an estimated sideslip angle and an estimated angle of attack of the trailing aircraft.

4. The apparatus of claim 3, wherein the estimated sideslip angle is based on at least one of a position of an aileron of the trailing aircraft, a position of an upper rudder of the trailing aircraft, a position of a lower rudder of the trailing aircraft, a lateral acceleration of the trailing aircraft, a roll rate of the trailing aircraft, and a yaw rate of the trailing aircraft.

5. An apparatus for controlling a formation flight of a trailing aircraft relative to a vortex generated by a leading aircraft, comprising:
   a position module configured to determine a position of the vortex relative to the trailing aircraft based on an estimator state vector comprising a relative position between the vortex and trailing aircraft, wherein the position module determines the position of the vortex relative to the trailing aircraft by recursively updating the estimator state vector based on a plurality of sensed measurements, wherein the position module updates the estimator state vector based on a selectable subset of the plurality of sensed measurements each time step;
   a desired position module configured to determine a desired position of the trailing aircraft relative to the vortex for providing desired vortex-induced aerodynamic benefits based on the position of the vortex; and
   a control module configured to control flight of the trailing aircraft based on the desired position of the trailing aircraft.

6. The apparatus of claim 5, wherein the relative position between the vortex and trailing aircraft comprises a relative lateral position of the vortex with respect to the trailing aircraft and a relative vertical position of the vortex with respect to the trailing aircraft.

7. The apparatus of claim 6, wherein the estimator state vector comprises a velocity of the leading aircraft in a lateral direction and a velocity of the leading aircraft in a vertical direction.

8. The apparatus of claim 7, wherein the estimator state vector comprises a wind gust component on the vortex in a lateral direction and a wind gust component on the vortex in a vertical direction.

9. The apparatus of claim 8, wherein the estimator state vector comprises a delay constant and a strength of the vortex.

10. The apparatus of claim 5, wherein the position module is configured to determine the position of the vortex relative to the trailing aircraft based on a measurement vector comprising the plurality of sensed measurements.

11. The apparatus of claim 5, wherein the plurality of sensed measurements comprises a longitudinal position of the leading aircraft relative to the trailing aircraft, a time-delayed lateral position of the leading aircraft relative to the trailing aircraft, a time-delayed vertical position of the leading aircraft relative to the trailing aircraft, a wind gust component acting on the trailing aircraft in a lateral direction, and a wind gust component acting on the trailing aircraft in a vertical direction.

12. The apparatus of claim 5, wherein the position module recursively updates the estimator state vector using a Kalman filter recursion technique and the subset of the plurality of sensed measurements comprises one of the plurality of sensed measurements.

13. The apparatus of claim 5, wherein the position module determines the position of the vortex relative to the trailing aircraft based on an estimated vortex-induced component of total body-axes forces acting on the trailing aircraft and an estimated vortex-induced component of a total body-axes moment acting on the trailing aircraft.

14. The apparatus of claim 5, wherein the position module is configured to update the estimator state vector based on a comparison between the position of the vortex relative to the trailing aircraft determined by the position module and at least one actual measurement of the relative position of the trailing aircraft with respect to the vortex.

15. The apparatus of claim 14, wherein the at least one actual measurement is obtained from output signals of a plurality of angle of attack vanes secured to the trailing aircraft.

16. The apparatus of claim 5, wherein the control module is configured to control the flight of the trailing aircraft based on a proportional-integral-derivative architecture.

17. The apparatus of claim 5, wherein the control module is configured to control the flight of the trailing aircraft based on a crosstrack rate feedback value.

18. The apparatus of claim 5, wherein the control module is configured to control the flight of the trailing aircraft based on at least one of a roll feedback value, a rudder feedback value, and a sideslip feedback value.

19. The apparatus of claim 5, wherein the position of the vortex comprises a lateral position component and a vertical position component.

20. An apparatus for controlling a formation flight of a trailing aircraft relative to a vortex generated by a leading aircraft, comprising:
a position module configured to determine a position of the vortex relative to the trailing aircraft based on an estimate of wind conditions at the leading aircraft and an estimator state vector comprising a relative position between the vortex and the trailing aircraft, the estimator state vector being based on a first set of measurements, wherein the position module updates the estimator state vector based on a comparison between at least one actual measurement obtained by the trailing aircraft and the position of the vortex relative to the trailing aircraft determined by the position module, the at least one actual measurement differing from the first set of measurements;
a peak-seeking module configured to determine a desired position of the trailing aircraft for providing desired vortex-induced aerodynamic benefits based on the position of the vortex relative to the trailing aircraft and a mapping function of an individual performance metric;
a limiter module configured to monitor the desired position of the trailing aircraft and modify the desired position of the trailing aircraft into a modified desired position of the trailing aircraft to avoid unintended crossings of the trailing aircraft into the vortex; and
a control module configured to control flight of the trailing aircraft based on one of the desired position of the trailing aircraft and modified desired position of the trailing aircraft.

* * * * *